(12) United States Patent
Jankowski

(10) Patent No.: US 11,654,928 B2
(45) Date of Patent: May 23, 2023

(54) VEHICLE OPERATIONAL DIAGNOSTICS, CONDITION RESPONSE, VEHICLE PAIRING, AND BLIND SPOT DETECTION SYSTEM

(71) Applicant: Airgo IP, LLC, Oklahoma City, OK (US)

(72) Inventor: Peter Jankowski, Oklahoma City, OK (US)

(73) Assignee: Airgo IP, LLC, Oklahoma City, OK (US)

( * ) Notice: Subject to any disclaimer, the term of this patent is extended or adjusted under 35 U.S.C. 154(b) by 286 days.

(21) Appl. No.: 16/947,314

(22) Filed: Jul. 28, 2020

(65) Prior Publication Data

US 2022/0032940 A1     Feb. 3, 2022

(51) Int. Cl.
| | | |
|---|---|---|
| *B60W 50/14* | (2020.01) | |
| *B60T 7/20* | (2006.01) | |
| *B60W 10/184* | (2012.01) | |
| *B60W 10/22* | (2006.01) | |
| *H04W 4/40* | (2018.01) | |
| *B60T 8/17* | (2006.01) | |
| *H04W 12/50* | (2021.01) | |
| *G06V 20/58* | (2022.01) | |
| *B60S 5/04* | (2006.01) | |

(52) U.S. Cl.
CPC .............. *B60W 50/14* (2013.01); *B60T 7/20* (2013.01); *B60T 8/1708* (2013.01); *B60W 10/184* (2013.01); *B60W 10/22* (2013.01); *G06V 20/58* (2022.01); *H04W 4/40* (2018.02); *H04W 12/50* (2021.01); *B60S 5/046* (2013.01)

(58) Field of Classification Search
None
See application file for complete search history.

(56) References Cited

U.S. PATENT DOCUMENTS

| | | |
|---|---|---|
| 1,072,907 A | 9/1913 | Brooks |
| 1,083,847 A | 1/1914 | McDowell |
| 1,165,057 A | 12/1915 | Bayly |
| 1,205,504 A | 11/1916 | Bearce |
| 1,827,662 A | 10/1931 | Maas |
| 2,156,841 A | 5/1939 | Davis |
| 2,177,042 A | 10/1939 | Michael |
| 2,242,207 A | 5/1941 | Bowers |
| 2,657,731 A | 11/1953 | Gozzoli |
| 2,849,047 A | 8/1958 | Lamont |
| 2,976,606 A | 3/1961 | Huet |

(Continued)

FOREIGN PATENT DOCUMENTS

WO    WO2006034212    3/2006

*Primary Examiner* — Todd Melton
(74) *Attorney, Agent, or Firm* — Hall Estill Law Firm

(57) ABSTRACT

A vehicle operational diagnostics and condition response system includes at least an axle supporting a vehicle frame, a suspension disposed between and secured to each the vehicle frame and the axle, a load detection device interacting with the suspension and communicating with a system controller, wherein the system controller is supported by the vehicle frame, and a vehicle pairing circuit, the vehicle pairing circuit interacting with the system controller. The vehicle pairing circuit activated by the system controller in response to load detection data received by the system controller from the load detection device.

20 Claims, 26 Drawing Sheets

(56) References Cited

U.S. PATENT DOCUMENTS

| | | | |
|---|---|---|---|
| 3,276,503 | A | 10/1966 | Kilmarx |
| 3,367,722 | A | 2/1968 | Miyanaga |
| 3,705,614 | A | 12/1972 | Juttner |
| 3,838,717 | A | 10/1974 | Wolf |
| 4,154,279 | A | 5/1979 | Tsuruta |
| 4,387,931 | A | 6/1983 | Bland |
| 4,582,107 | A | 4/1986 | Scully |
| 4,641,698 | A | 2/1987 | Bitonti |
| 4,685,501 | A | 8/1987 | Williams |
| 4,805,681 | A | 2/1989 | Vollmer |
| 4,844,138 | A | 7/1989 | Kokubu |
| 4,883,106 | A | 11/1989 | Schultz |
| 4,924,926 | A | 5/1990 | Schultz |
| 5,080,156 | A | 1/1992 | Bartos |
| 5,080,157 | A | 1/1992 | Oerter |
| 5,174,839 | A | 12/1992 | Schultz |
| 5,236,028 | A | 8/1993 | Goodell |
| 5,287,906 | A | 2/1994 | Stech |
| 5,377,736 | A | 1/1995 | Stech |
| 5,398,743 | A | 3/1995 | Bartos |
| 5,429,167 | A | 7/1995 | Jensen |
| 5,478,974 | A | 12/1995 | O'Dea |
| 5,482,358 | A | 1/1996 | Kuck |
| 5,538,062 | A | 7/1996 | Stech |
| 5,558,408 | A | 9/1996 | Naedler |
| 5,584,949 | A | 12/1996 | Ingram |
| 5,650,930 | A | 7/1997 | Hagenbuch |
| 5,735,364 | A | 4/1998 | Kinoshita |
| 5,752,746 | A | 5/1998 | Perry |
| 5,767,398 | A | 6/1998 | Naedler |
| 5,769,979 | A | 6/1998 | Naedler |
| 5,780,782 | A | 7/1998 | O'Dea |
| 5,863,057 | A | 1/1999 | Wessels |
| 6,037,550 | A | 3/2000 | Bradley |
| 6,105,645 | A | 8/2000 | Ingram |
| 6,435,238 | B1 | 8/2002 | Hennig |
| 6,449,582 | B1 | 9/2002 | Chaklader |
| 6,585,019 | B1 | 7/2003 | Ingram |
| 6,688,168 | B1 | 2/2004 | Elliott |
| 6,803,530 | B2 | 10/2004 | Carlstrom |
| 6,921,100 | B2 | 7/2005 | Mantini |
| 6,968,882 | B2 | 11/2005 | Ingram |
| 6,970,094 | B2 | 11/2005 | Yamashita |
| 6,983,883 | B2 | 1/2006 | Ridling |
| 7,072,763 | B2 | 7/2006 | Saxon |
| 7,302,980 | B2 | 12/2007 | Ingram |
| 7,418,989 | B2 | 9/2008 | Ingram |
| 7,572,988 | B1 | 8/2009 | Morton |
| 7,681,431 | B2 | 3/2010 | Roquemore, III |
| 7,705,715 | B2 | 4/2010 | Hax |
| 8,374,748 | B2 | 2/2013 | Jolly |
| RE45,012 | E | 7/2014 | Jones |
| 9,145,559 | B2 | 9/2015 | Shaul et al. |
| 9,631,969 | B1 | 4/2017 | Whalen |
| 10,858,053 | B2 * | 12/2020 | Bean .................. G05B 19/4185 |
| 2002/0179345 | A1 | 12/2002 | Bell |
| 2003/0060923 | A1 | 3/2003 | Scotese |
| 2004/0178005 | A1 | 9/2004 | Carlstrom |
| 2004/0187568 | A1 | 9/2004 | Locatelli |
| 2005/0133134 | A1 | 6/2005 | Ingram |
| 2006/0179929 | A1 | 8/2006 | Becker |
| 2009/0187343 | A1 | 7/2009 | Koch-Groeber |
| 2010/0045209 | A1 | 2/2010 | Daley |
| 2011/0022248 | A1 | 1/2011 | McQuade |
| 2013/0325253 | A1 | 12/2013 | Watanabe |
| 2014/0032039 | A1 | 1/2014 | Dwan |
| 2014/0129046 | A1 | 5/2014 | Engstrand |
| 2014/0261939 | A1 | 9/2014 | Therber |
| 2015/0034399 | A1 | 2/2015 | Clayton |
| 2015/0226598 | A1 | 8/2015 | Lawn |
| 2016/0023588 | A1 | 1/2016 | Peterson |
| 2016/0046299 | A1 | 2/2016 | Fung |
| 2016/0257355 | A1 | 9/2016 | Siuchta |
| 2017/0030764 | A1 | 2/2017 | Lawn |
| 2018/0186208 | A1 | 7/2018 | Coombs |
| 2018/0244281 | A1 | 8/2018 | Jankowski |
| 2020/0338941 | A1 * | 10/2020 | Slade .................... B62D 63/08 |

\* cited by examiner

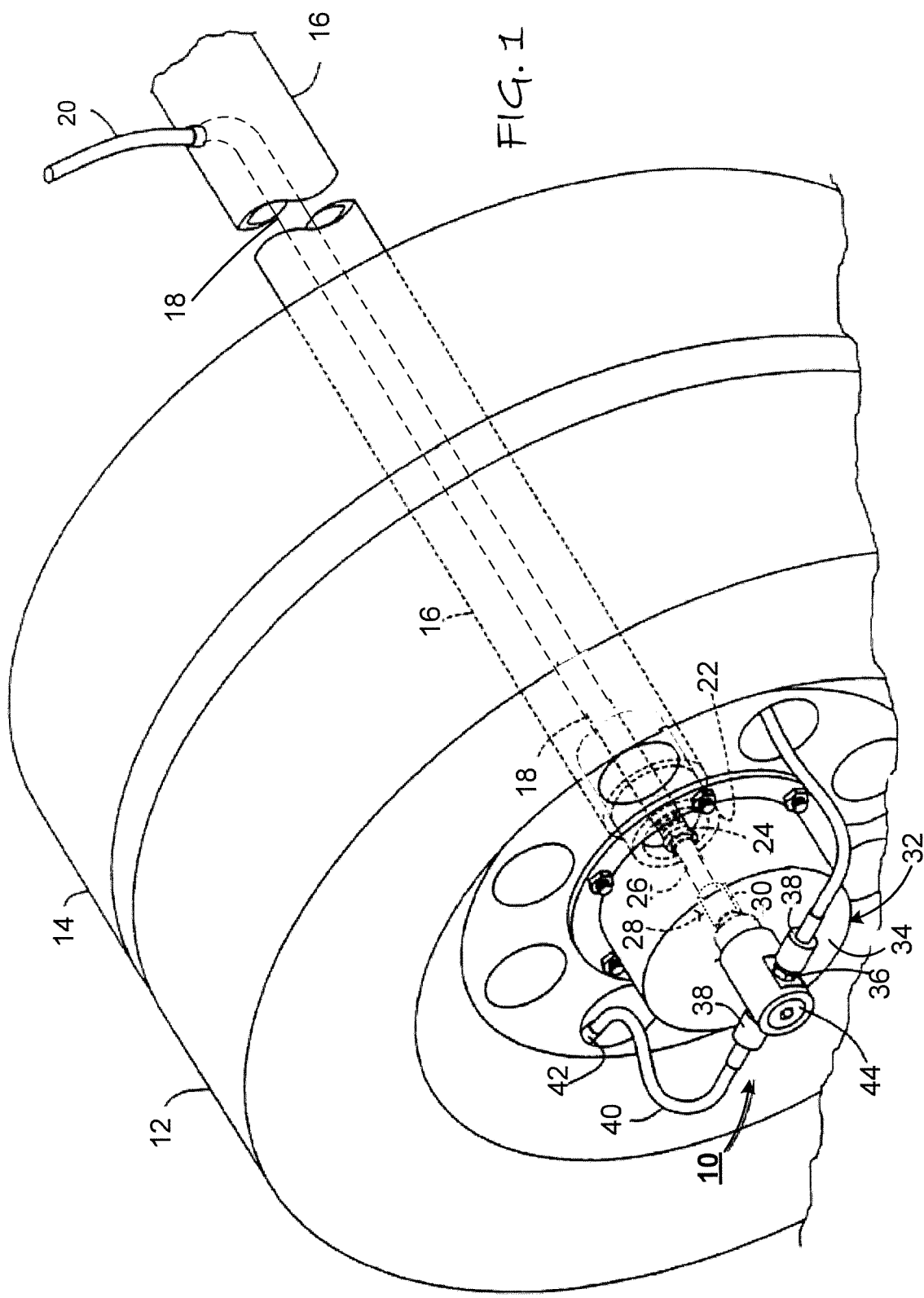

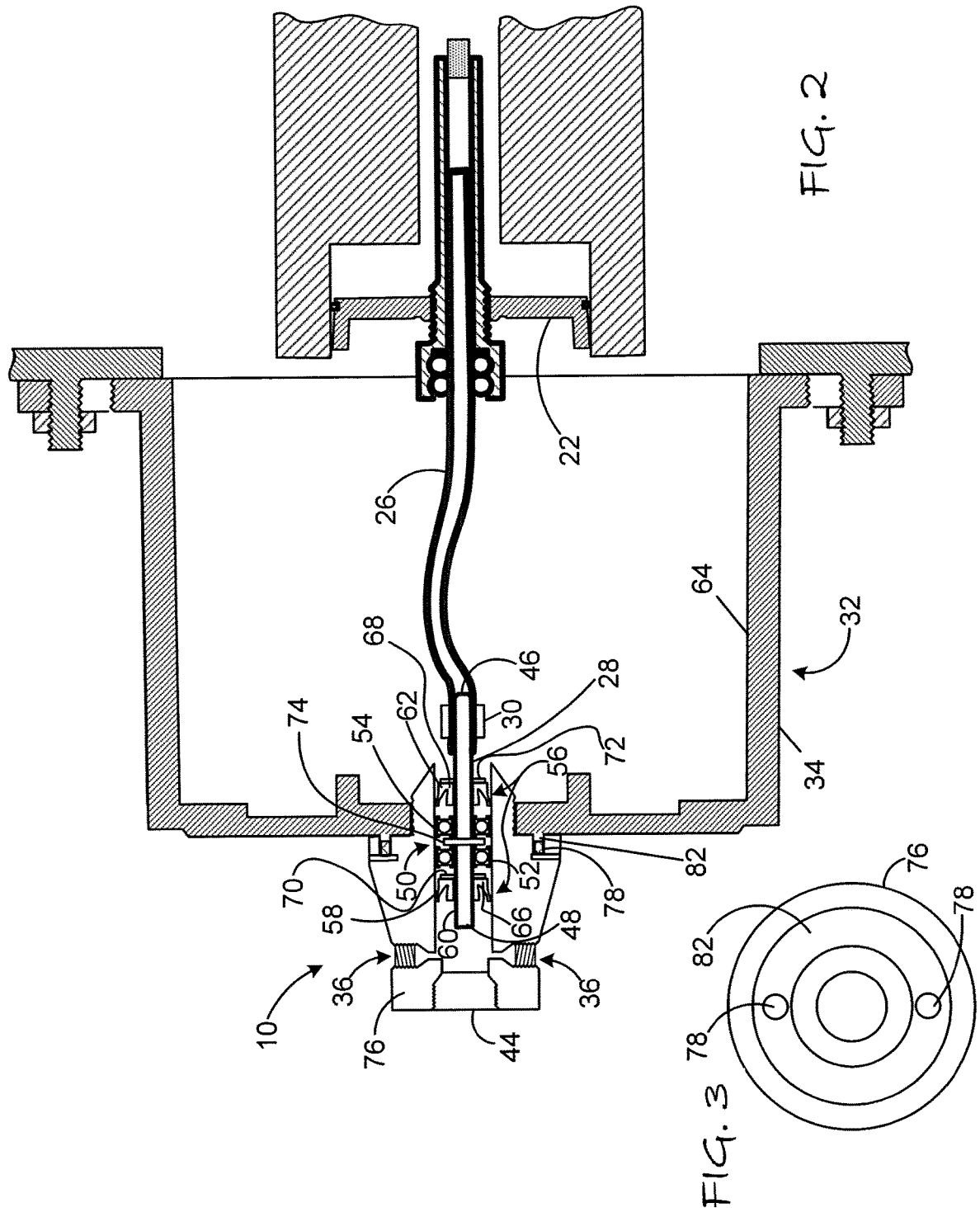

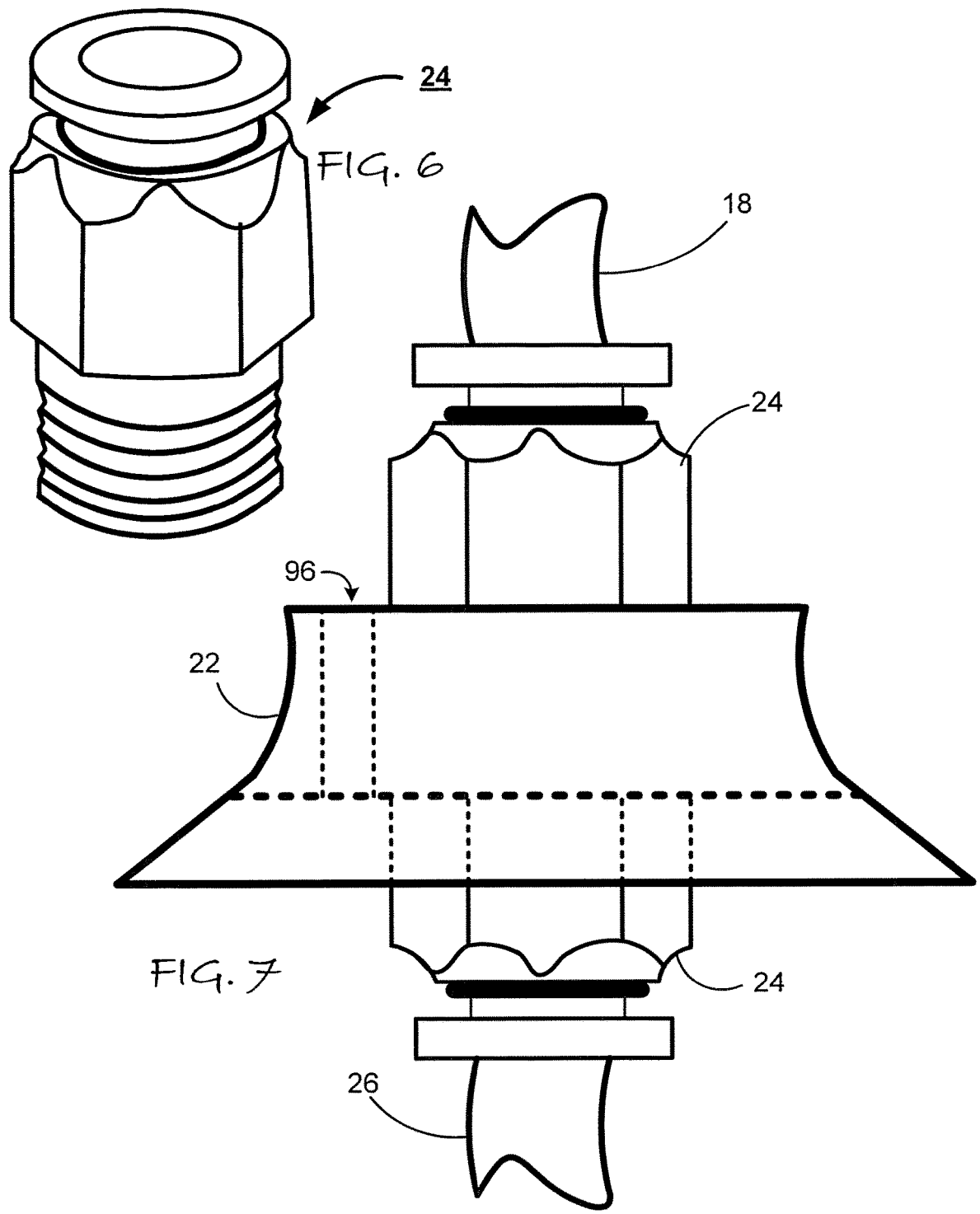

VEHICLE OPERATIONAL DIAGNOSTICS, CONDITION RESPONSE, VEHICLE PAIRING, AND BLIND SPOT DETECTION SYSTEM

FIELD OF THE INVENTION

The present invention relates to the field of tire pressure maintenance. More particularly, the present invention relates to: the management of tire pressure of tires supporting semi-tractors and semi-trailers, even while the tractor trailer pair are traveling along a roadway; and to the electronic pairing of semi-tractors to semi-trailers.

BACKGROUND OF THE INVENTION

As tire inflation systems become adopted for broader uses, reliability and ease of maintenance, as well as an ability to manage under inflated as well as over inflated tires, as well as overall tractor-trailer diagnostics, condition response, and system pairing have emerged as important demands from the industry, accordingly improvements in apparatus and methods of installing tire inflation systems, diagnostics, and system response techniques are needed and it is to these needs the present invention is directed.

SUMMARY OF THE INVENTION

In accordance with preferred embodiments, a vehicle operational diagnostics and condition response system includes at least an axle supporting a vehicle frame, a suspension interposed between and secured to each the vehicle frame and the axle, a load detection device interacting with the suspension and communicating with a system controller, wherein the system controller is supported by the vehicle frame, and a vehicle pairing circuit, the vehicle pairing circuit interacting with the system controller. The vehicle pairing circuit activated by the system controller in response to load detection data received by the system controller from the load detection device.

These and various other features and advantages that characterize the claimed invention will be apparent upon reading the following detailed description and upon review of the associated drawings.

BRIEF DESCRIPTION OF THE DRAWINGS

The present invention is illustrated by way of example and not limitation in the figures of the accompanying drawings, in which like references indicate similar elements and in which:

FIG. 1 is a partial perspective view of a rotary union assembly of the present novel tire pressure management system shown secured to an outer wheel of a pair of tractor trailer tires mounted on a stationary axle.

FIG. 2 is a sectional side view of the rotary union assembly of the present novel tire pressure management system and associated axle spindle.

FIG. 3 is bottom plan view of the rotary union assembly of the present novel tire pressure management system.

FIG. 6 is a view in perspective of a push to connect fluid fitting of the rotary union assembly of FIG. 1.

FIG. 7 is a side elevation view of a pair of push to connect fluid fittings of the present novel tire pressure management system of FIG. 1.

DESCRIPTION OF PREFERRED EMBODIMENTS

Figure 4:
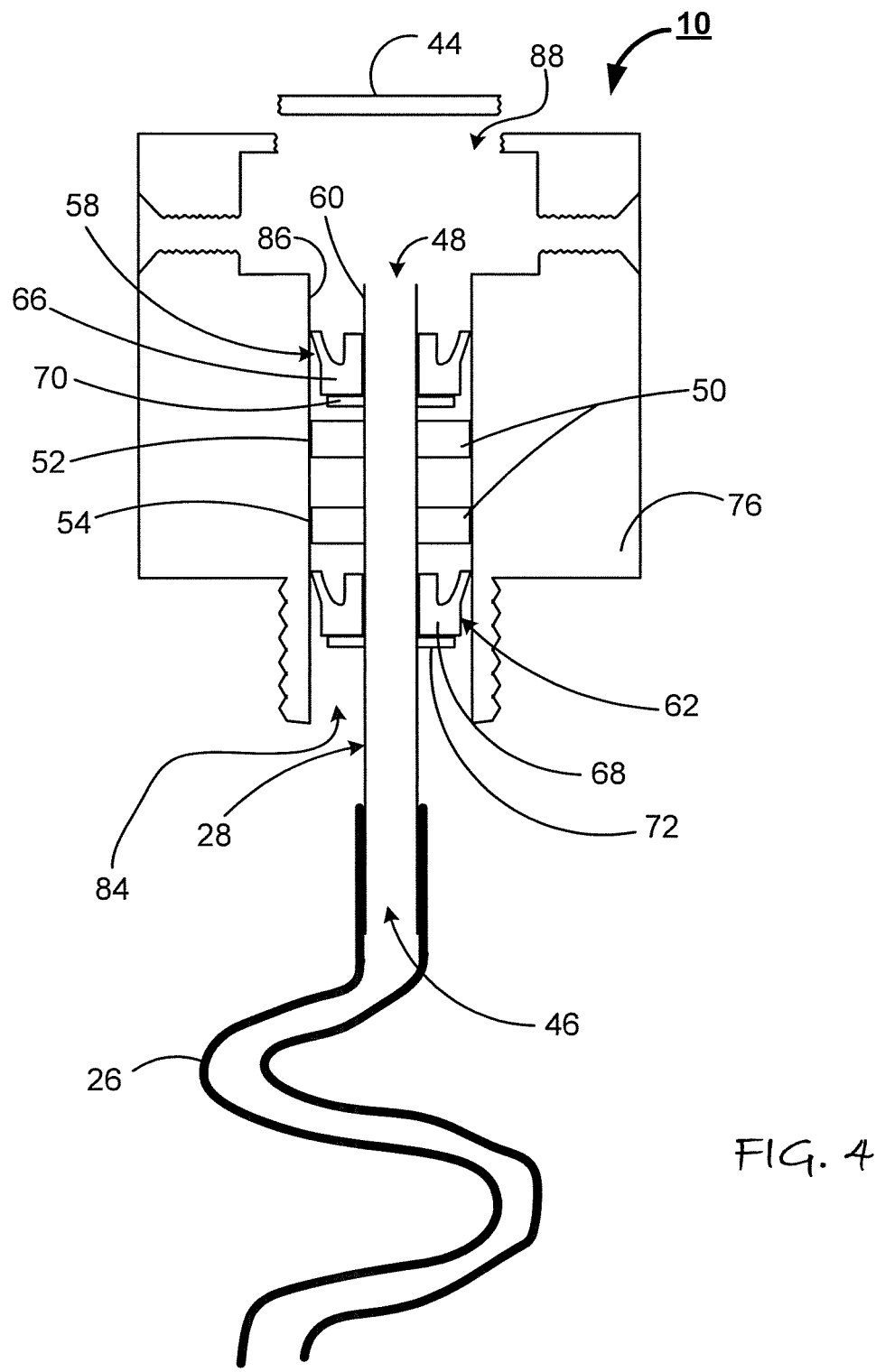
FIG. 4 is a cross-sectional side view of the rotary union housing, air lines and associated seals preferably employed by the present novel tire pressure management system.

It will be readily understood that elements of the present invention, as generally described and illustrated in the Figures herein, could be arranged and designed in a wide variety of different configurations. Referring now in detail to the drawings of the preferred embodiments, the rotary union assembly 10 (also referred to herein as assembly 10, and rotary union 10) of the first preferred embodiment, while useable on a wide variety of movable vehicles employing stationary axles for automatically maintaining the inflation pressure of the pneumatic tires thereon, is particularly adapted for use on tractor trailers. Accordingly, the assembly 10 of the first preferred embodiment will be described in conjunction with a pair of adjacent vehicle tires 12 and 14 mounted on a stationary tractor trailer axle 16 (also referred to herein as trailer axle 16, and axle 16). While identical rotary union assemblies 10 are provided at the end of each axle on the trailer to maintain the inflation pressure of the tires carried thereby, in each: the preferred embodiment; the alternate preferred embodiment; and the alternative preferred embodiment, reference will be made to only one such assembly and the pair of tires it services.

Preferably, the trailer axle 16 which carries tires 12 and 14 is sealed and functions as a source for pressurized fluid, else houses an air supply line 18 to supply air to the rotary union assembly 10. A fluid supply line 20 preferably provides air under pressure to the interior of the axle 16, else to an air supply line 18, from the conventional air compressor on the tractor via a standard pressure protection valve and control box (not shown) to pressurize the axle 16, else to pressurize the air supply line 18, at the cold tire pressure of the trailer tires. FIG. 1 further shows that the axle 16 supports an axle plug 22, which in turn supports a push to connect fluid fitting 24. Preferably, the push to connect fluid fitting 24 is attached to and in fluid communication with a fill tube 26, which in a preferred embodiment is a flexible fill tube 26. Preferably, the flexible fill tube 26 is connected to a fluid conduit 28, which supplies pressurized air to the rotary union assembly 10. Preferably, the flexible fill tube 26 is secured to the fluid conduit 28, by a compression fitting 30. As those skilled in the art would know, a compression fitting, or alternate mechanical means, could serve the function of the push to connect fluid fitting 24.

In a preferred embodiment, the rotary union assembly 10 is mounted to a hubcap 32, from an exterior 34 of the hubcap 32, and provides pressurized air, by way of an air delivery channel 36, to tire pressure hose fittings 38 that are secured to tire pressure hoses 40. Each tire pressure hose 40 supplies the pressurized air to tire valve stems 42 of tires 12 and 14. Preferably, the rotary union assembly 10 provides a removable seal access cover 44, which mitigates escapement of pressurized fluid from the air delivery channel 36, the tire pressure hoses 40, and the tires 12 and 14.

As seen in FIGS. 2 and 3, the fluid conduit 28 provides a downstream end 48 and an upstream end 46, and the rotary union assembly 10 further preferably includes a pair of bearings 50, in which each of the pair of bearings 50 provides an inner race and an outer race. In a preferred embodiment, a first bearing 52, of the pair of bearings 50, is adjacent the downstream end 48, of the fluid conduit 28, while the second bearing 54, of the pair of bearings 50, is adjacent the upstream end 46, of the fluid conduit 28.

FIG. 2 further shows that in a preferred embodiment, the rotary union assembly 10, further includes a pair of fluid seals 56, with a first fluid seal 58, is preferably disposed between the first bearing 52, and the downstream end 48 of the fluid conduit 28, while the second fluid seal 62, of the pair of fluid seals 56, is preferably disposed between the second bearing 54, and the upstream end 46, of the fluid conduit 28. In a preferred embodiment, the second fluid seal 62 mitigates transfer of an environment contained within an interior 64, of the hubcap 32, from entry into the pair of bearings 50.

FIG. 2 further shows that in a preferred embodiment, each of the pair of fluid seals 56 (58 and 62), provide a base portion (66 and 68 respectfully), and the rotary union assembly 10, further includes: a first fluid seal restraint 70, which is disposed between the first bearing 52, and the base portion 66 of the first fluid seal 58, and in pressing engagement with the external surface 60 of the fluid conduit 28; and a second fluid seal restraint 72, which is disposed between the base portion 68 of the second fluid seal 62, and in pressing engagement with the external surface 60 of the fluid conduit 28. FIG. 2 still further shows that the rotary union 10, preferably includes a bearing spacer 74, disposed between the first bearing 52 and the second bearing 54 of the pair of bearings 50. The bearing spacer 74 provides stability of the first and second bearings (52, 54) during the process of pressing the pair of bearings 50 into a rotary union housing 76, of the rotary union assembly 10.

As discussed hereinabove, in a preferred embodiment, the second fluid seal 62, mitigates transfer of an environment contained within an interior 64, of the hubcap 32, from entry into the pair of bearings 50. However, if the environment within the hubcap 32 elevates in pressure, a spring loaded pressure relief valve 78 (such as a poppet valve), else a pressure relief seal 80 (of FIG. 9) also referred to herein as a pressure equalization structure 80 (of FIG. 11), confined by an excess pressure collection chamber 82 (which is provided by the rotary union housing 76, and is in contact adjacency with the exterior 34, of the hubcap 32, and shown by FIGS. 2 and 3), activates to relieve the pressure present in the pressure collection chamber 82, to atmosphere. That is, when the pressure contained by the pressure collection chamber 82 reaches a predetermined pressure level, which in a preferred embodiment is in the range of 5 to 8 PSI.

FIG. 4 shows a preferred embodiment that preferably includes at least the rotary union housing 76, supporting and confining the fluid conduit 28, within a central bore 84 (also referred to herein as channel 84), of the rotary union housing 76. The fluid conduit 28 preferably provides the downstream end 48 and the upstream end 46. Further shown by FIG. 4 is the pair of bearings 50; each of the pair of bearings 50 provides an inner race and an outer race. Each inner race of the pair of bearings 50, is in pressing communication with the external surface 60, of the fluid conduit 28, and each outer race of the pair of bearings 50, is in pressing communication with a bore surface 86 (also referred to herein as wall 86), of the central bore 84, of the rotary union housing 76. The first bearing 52, of the pair of bearings 50, is adjacent the downstream end 48, of the fluid conduit 28, and the second bearing 54, of the pair of bearings 50, is adjacent the upstream end 46, of the fluid conduit 28.

FIG. 4 further shows that in a preferred embodiment, the rotary union 10 preferably includes a pair of fluid seals 56, the first fluid seal 58, of the pair of fluid seals 56, engages the external surface 60, of the fluid conduit 28, and is disposed between the first bearing 52, and the downstream end 48, of said fluid conduit 28. The second fluid seal 62, of the pair of fluid seals 56, engages the external surface 60 of the fluid conduit 28, and is disposed between said second bearing 54, and the upstream end 46, of the fluid conduit 28. In a preferred embodiment, the first fluid seal 58 provides the base portion 66, and the first fluid seal restraint 70, which is in pressing contact with the external surface 60 of the fluid conduit 28, abuts against the base portion 66, of the first fluid seal 58, to maintain the relative position of the first fluid seal 58, adjacent the bore surface 86, of the central bore 84; and the second fluid seal 62, provides the base portion 68, and the second fluid seal restraint 72, which is in pressing contact with the external surface 60 of the fluid conduit 28, abuts against the base portion 68, of the second fluid seal 62, to maintain the relative position of the second fluid seal 62, adjacent the bore surface 86, of the central bore 84. In a preferred embodiment, the rotary union housing 76 further provides a fluid distribution chamber 88 (also referred to herein as a fluid chamber 88), which is in fluid communication with the downstream end 48, of the fluid conduit 28. The fluid chamber 88, receives pressurized air from the fluid conduit 28, and transfers the received pressurized air to the tires 12 and 14 (of FIG. 1).

Figure 5:
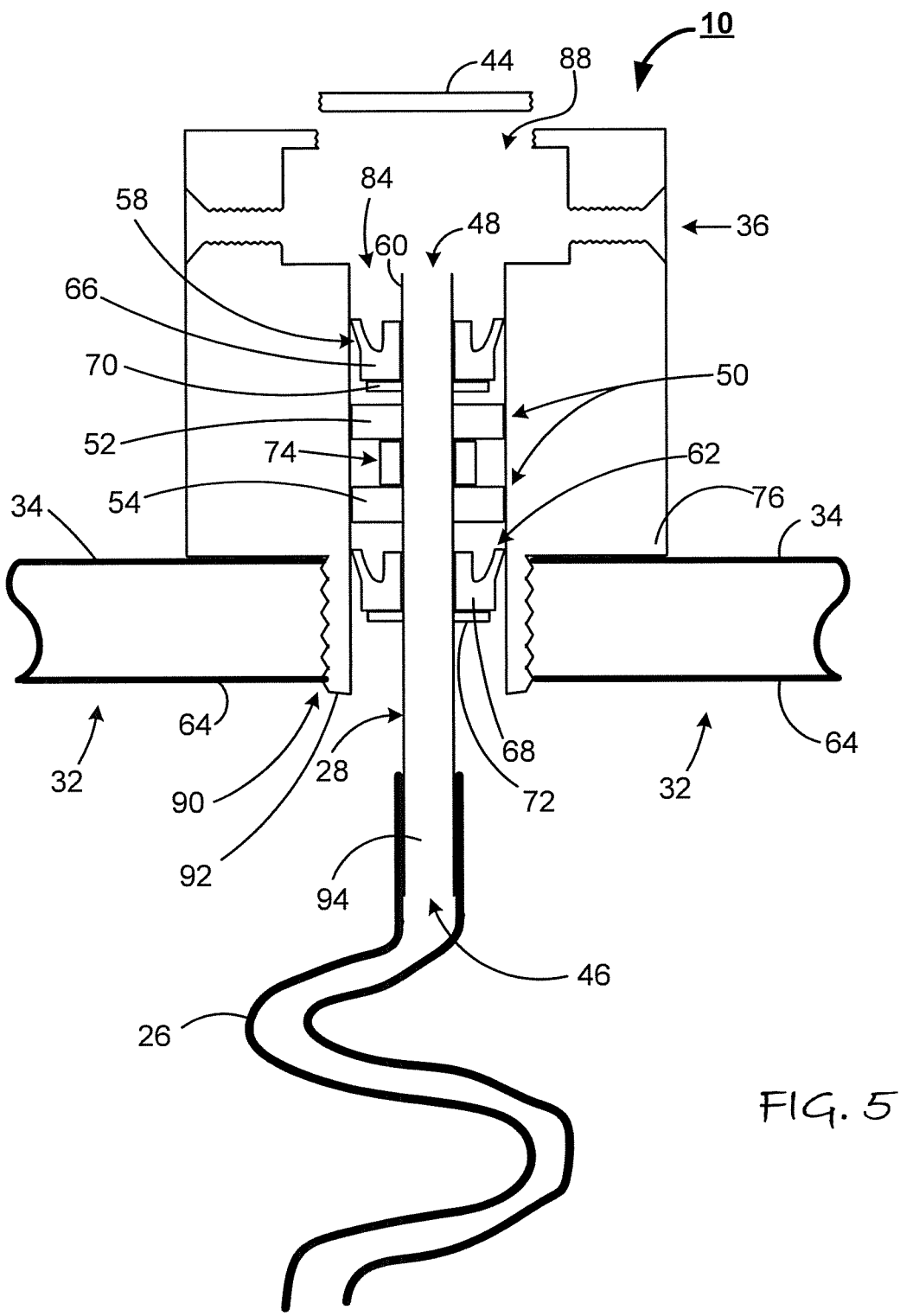
FIG. 5 is a cross-sectional side view of an alternate rotary union assembly of the present novel tire pressure management system and its associated bearings and bearing spacer.

FIG. 5 shows that in a preferred embodiment, the hubcap 32 provides an attachment aperture 90. The attachment aperture 90 is preferably disposed between the interior 64 and the exterior 34, of the hubcap 32. The attachment aperture 90 provides an axis of rotation, which is preferably substantially aligned with an axis of the axle 16 (of FIG. 1). Additionally, the rotary union housing 76 provides at least an attachment member 92, which preferably is in mating communication with the attachment aperture 90. FIG. 5 further shows that the fluid conduit 28 provides a fluid communication portion 94, which extends beyond the attachment member 92, and into the interior of said hubcap 32.

FIGS. 6 and 7 show the push to connect fluid fitting 24, of a preferred embodiment. The push to connect fitting, model No. 1868X4 by Eaton Weatherhead, of Maumee, Ohio is an example of a push to connect fitting of the type found useful in a preferred embodiment. FIG. 7 shows that in a preferred embodiment, two push to connect fluid fittings 24, are secured to the axle plug 22. In a preferred embodiment, one of the pair of push to connect fluid fittings 24 is in fluid communication with the air supply line 18, while the other is in fluid communication with the fill tube 26. FIG. 7 shows that in a preferred alternate embodiment, the axle plug 22, provides a pressure transfer conduit 96, which is used to disburse pressurized air, which may accumulate in the interior 64, of the hubcap 32 (both of FIG. 4), back into the axle housing 16, when the air supply line 18, is utilized to convey pressurized air to the rotary union 10 (of FIG. 2).

Figure 8:
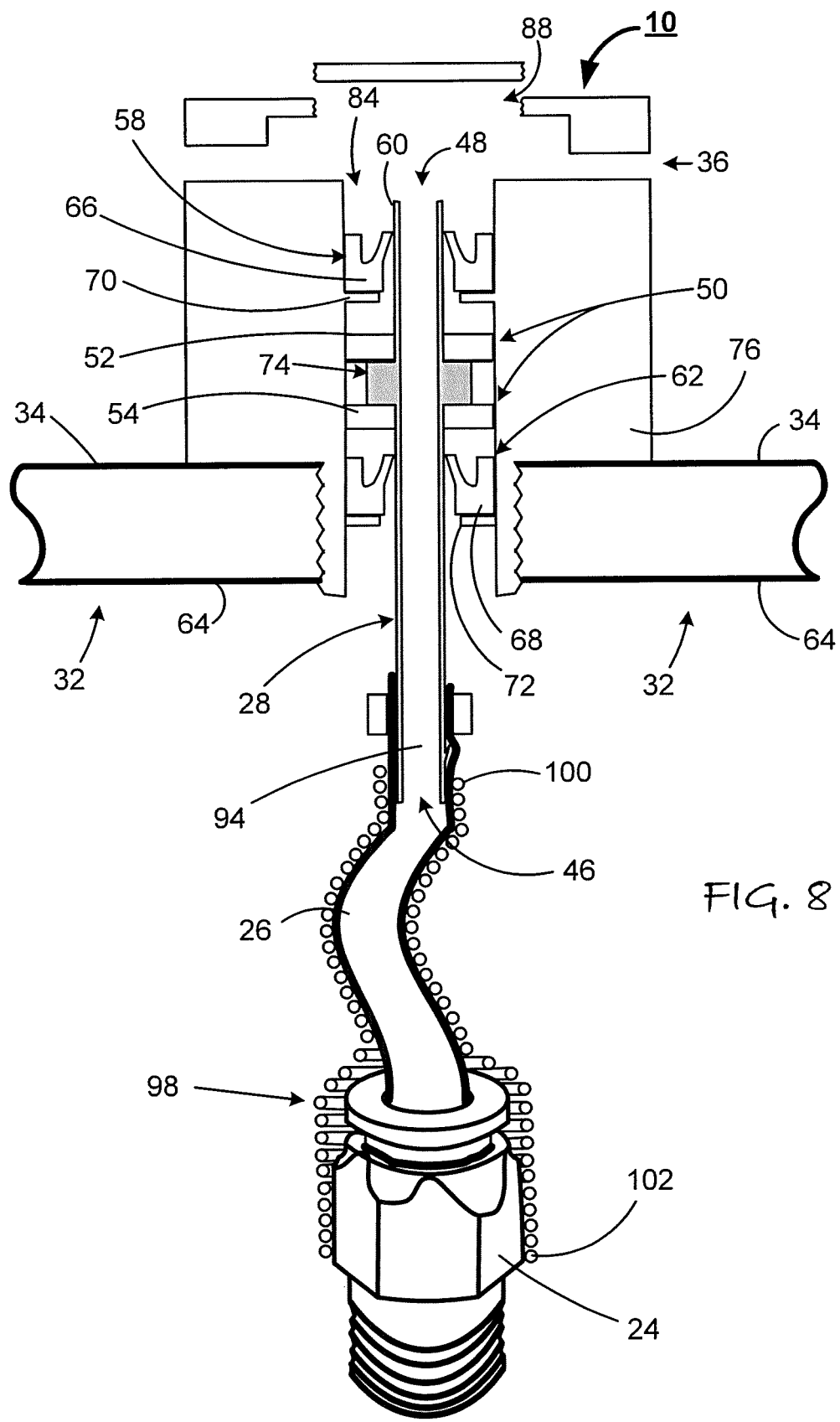
FIG. 8 is a cross-section view of the rotary union housing of an alternative rotary union assembly of the present novel tire pressure management system showing an anti-rotational means.

FIG. 8 depicts an alternate preferred embodiment of the present invention, in which the fluid conduit 28, provides the bearing spacer 74, and the rotary union housing 76 provides the first fluid seal restraint 70. Additionally, in a preferred embodiment, the fill tube 26 is a flexible fill tube formed from a polymer, such as a polyurethane based material, else a metallic material, such as a shape memory alloy. FIG. 8 further shows that when the flexible fill tube 26 is connected to the push to connect fluid fitting 24, an anti-rotational means 98 is incorporated into the rotary union 10. Preferably, the anti-rotational means 98 has a first end 100, and a second end 102. The first end 100 of the anti-rotational means 98, is secured to the flexible fill tube 26, adjacent the fluid communication portion 94. The second end 102, of the anti-rotational means 98, connects to the push to connect fluid fitting 24. Preferably, the anti-rotational means 98 mitigates rotation of the fill tube 26, when the rotary union housing 76, in conjunction with the hubcap 32, rotates about the fluid conduit 28. By example, but not by limitation, a coiled spring has been found useful as the anti-rotational means 98, in an alternate example, but not by way of limitation, a torsion bar 104 (of FIG. 9) has been found useful to serve as an anti-rotational means 98. However, as those skilled in the art will appreciate, any of a host of mechanical structures, which serve to mitigate rotation of the fill tube 26, when the rotary union housing 76, in conjunction with the hubcap 32, rotates about the fluid conduit 28 may be employed to serve this purpose.

Figure 9:
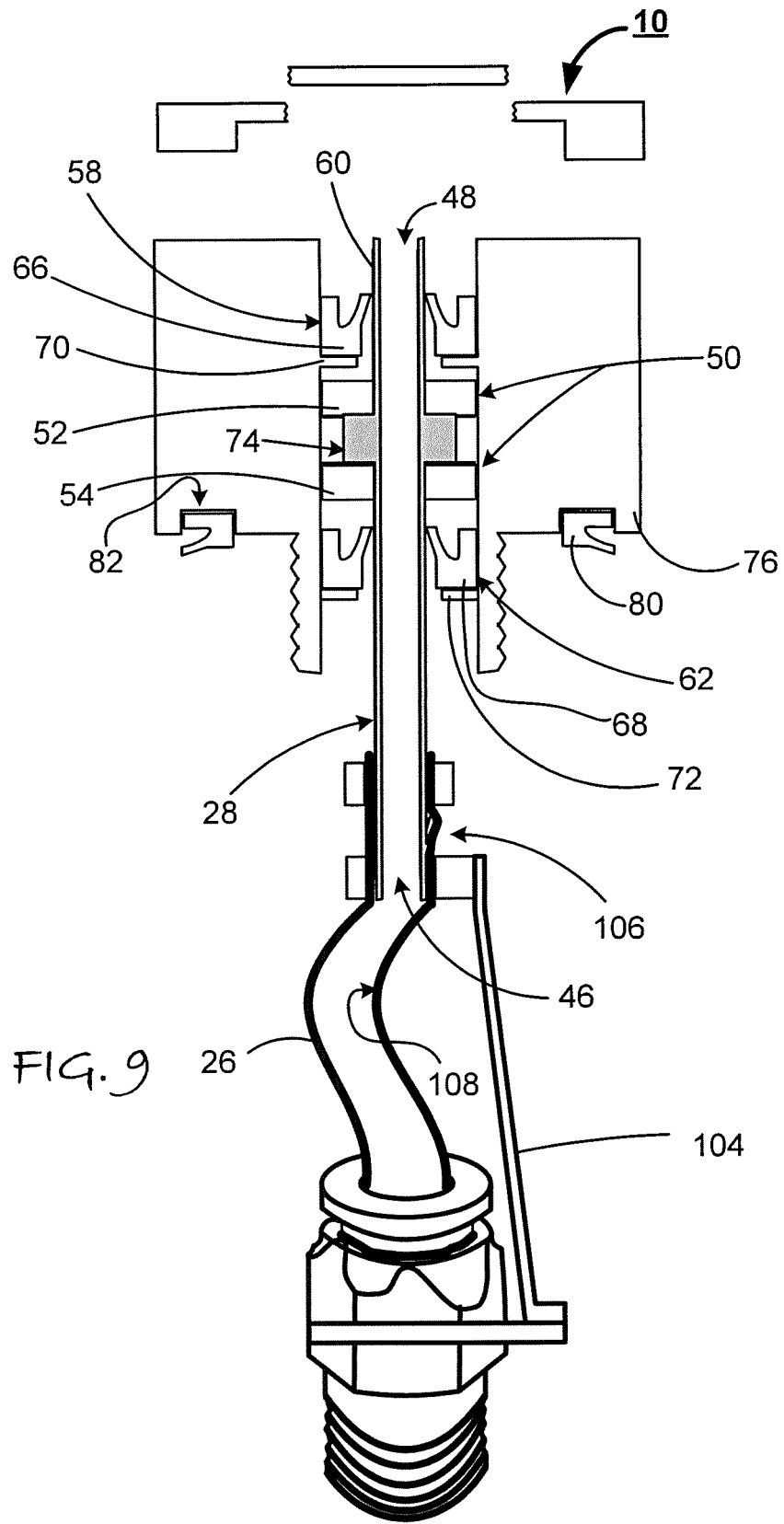
FIG. 9 is a cross-section view of the rotary union housing of the alternative rotary union assembly of FIG. 8, of the present novel tire pressure management system showing an alternate anti-rotational means.

In an alternate preferred embodiment, in addition to the fluid chamber 88, the rotary union housing 76, further provides the air delivery channel 36, which is in fluid communication with, and extending radially from, said fluid chamber 88, as shown by FIG. 8, the fluid conduit 28, further provides a retention barb 106, protruding from the fluid conduit 28, and communicating with an interior surface 108, of said flexible fill tube 26. The retention barb 106, mitigates an inadvertent removal of said flexible fill tube 26, from the fluid conduit 28. The retention barb 106, is preferably positioned adjacent to, and downstream from the compression fitting 30, as shown by FIG. 9.

Figure 10:
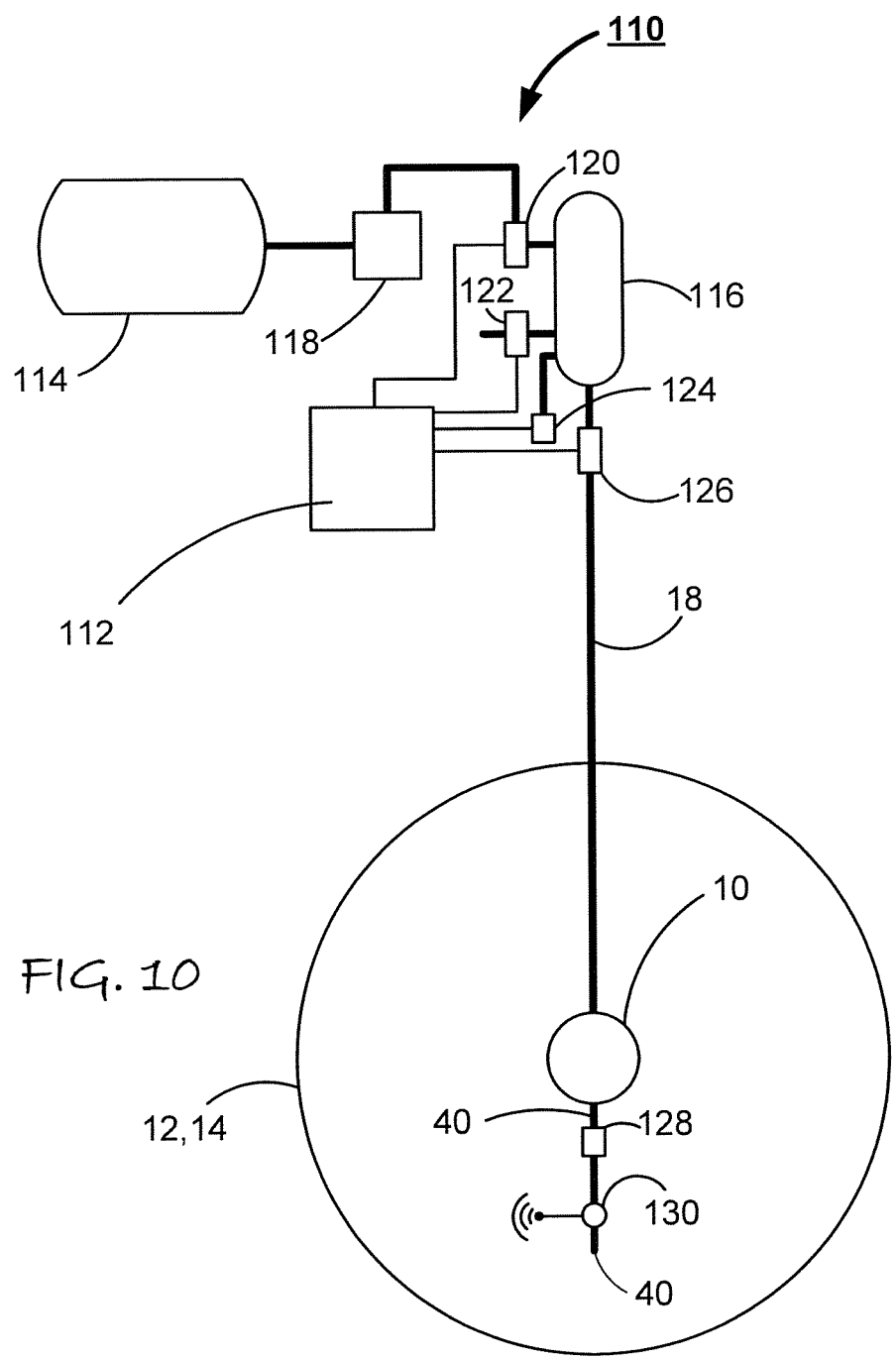
FIG. 10 is a block diagram of the present novel tire pressure management system of FIG. 1.

FIG. 10 shows a tire pressure management system 110, which preferably includes at least a fluid pressure controller 112, which in a preferred embodiment controls the flow of pressurized air into and out of the tires 12 and 14. The source of the pressurized air is a trailer air tank 114. The trailer air tank 114, is in fluidic communication with a tire pressure tank 116. The pressurized air from the trailer air tank 114 passes through an air regulator 118, and then through an air inlet control valve 120, operating under the control of the fluid pressure controller 112. In a preferred embodiment, the tire pressure management system 110, further includes at least: an air outlet valve 122, in fluid communication with the tire pressure tank 116, and under the control of the fluid pressure controller 112; a tire pressure tank pressure gauge 124, in fluid communication with the tire pressure tank 116, and in electronic communication with the fluid pressure controller 112; and an air pressure supply valve 126, in fluid communication with the tire pressure tank 116, and under the control of the fluid pressure controller 112. Preferably, the air pressure supply valve 126, supplies pressurized air to, or conversely, receives pressurized air from the air supply line 18, depending on whether the pressure in the tire (12,14), is above or below a desired pressure level.

In a preferred embodiment, pressurized air that flows into or out of the rotary union 10, is modulated by a dual flow control valve 128. Preferably, the dual flow control valve 128, responds to air pressure supplied by the air supply line 18, by opening a spring loaded valve member, which allows pressurized air to flow out of the tire (12,14), when the pressure in the tire (12,14), is greater than the air pressure in the air supply line 18. Conversely, the dual flow control valve 128, promotes the flow of pressurized air into the tire (12, 14), when the pressure level within the tire 12, 14 is less than the air pressure in the air supply line 18.

FIG. 10 further shows that the tire pressure management system 110, further preferably includes a tire pressure monitoring sensor 130, disposed between the dual flow control valve 128, and the tire (12,14), and in electronic communication with the fluid pressure controller 112. In a preferred embodiment, the tire pressure monitoring sensor 130, measures the level of pressure within the tire (12, 14), and relays the measured pressure level to the fluid pressure controller 112. The fluid pressure controller 112, compares the measured pressure level within the tire (12,14) to a target pressure, maintains the pressure available in the tire pressure tank 116 at the target level, and directs the air pressure supply valve 126, to release pressurized air to the dual flow control valve 128, which activates to promote either inflation, or deflation of the tire (12,14), to bring the pressure level within the tire (12,14) into balance with the target pressure level. Once the desired pressure level within the tire (12, 14) is achieved, as measured by the tire pressure monitoring sensor, the fluid pressure controller 112, directs the air pressure supply valve 126, to disengage.

In a preferred embodiment, the fluid pressure controller 112, operates both the air outlet valve 122, and the air inlet control valve 120, to maintain the pressure within the tire pressure tank 116, at a predetermined pressure level. For example, but not by way of limitation, if the tire pressure of the tires (12, 14) is above the target pressure level, the fluid pressure controller 112, will crack open the air outlet valve 122, to allow relief of pressure from the system; and if the tire pressure of the tires (12, 14) is below the target pressure level, the fluid pressure controller 112, will crack open the air inlet control valve 120, to allow pressure to build in the system.

Figure 11:
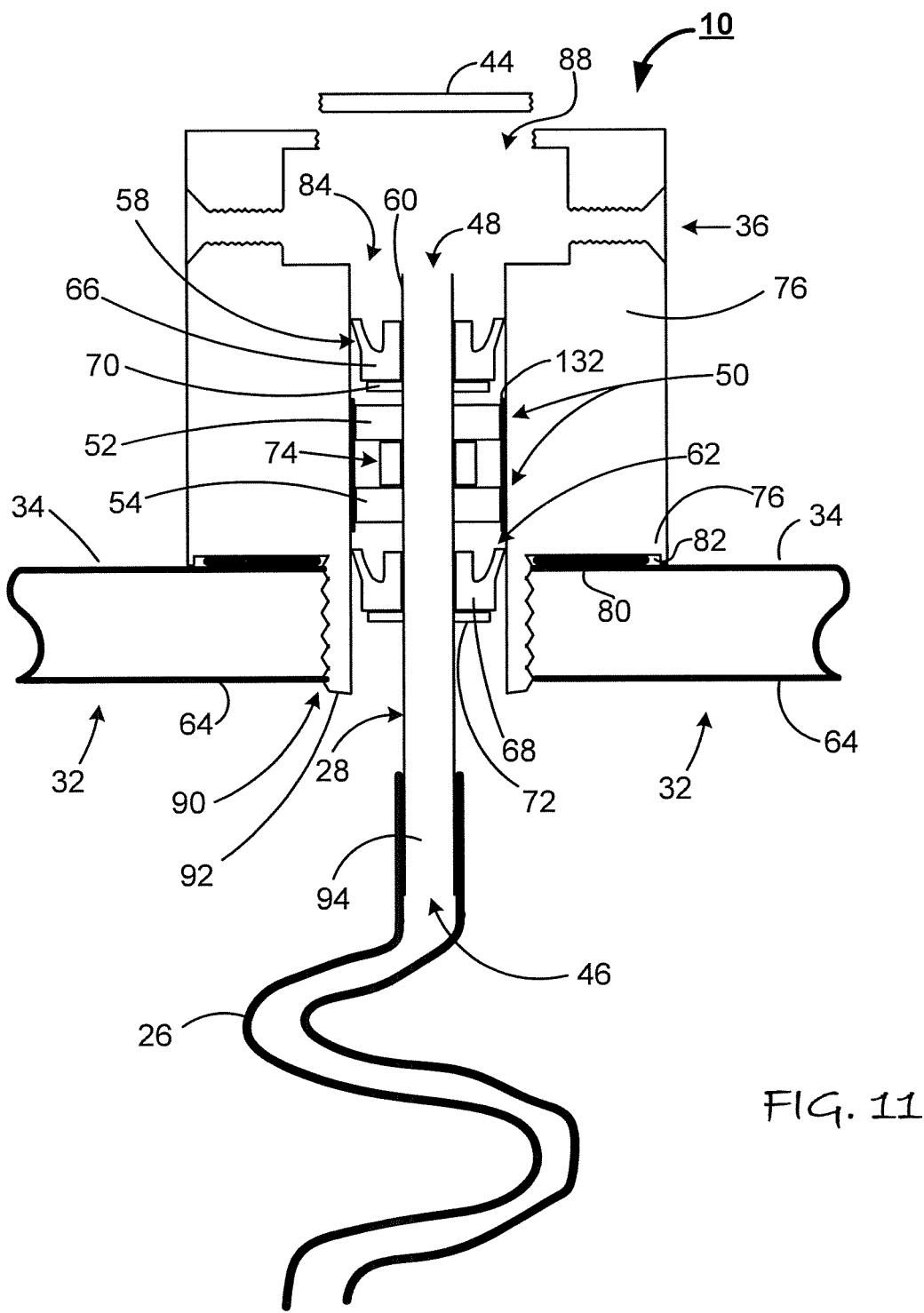
FIG. 11 is a cross-sectional side view of the rotary union housing, air lines, bearing sleeve, and associated seals preferably employed by the present novel tire pressure management system.

FIG. 11 shows a preferred embodiment that preferably includes at least the rotary union housing 76, supporting and confining the fluid conduit 28, within a central bore 84 (also referred to herein as channel 84), of the rotary union housing 76. The fluid conduit 28 preferably provides the downstream end 48 and the upstream end 46. Further shown by FIG. 4 is the pair of bearings 50; each of the pair of bearings 50 provides an inner race and an outer race. Each inner race of the pair of bearings 50, is in pressing communication with the external surface 60, of the fluid conduit 28, and each outer race of the pair of bearings 50, is in pressing communication with a bore surface 86 (also referred to herein as wall 86), of the central bore 84, of the rotary union housing 76. The first bearing 52, of the pair of bearings 50, is adjacent the downstream end 48, of the fluid conduit 28, and the second bearing 54, of the pair of bearings 50, is adjacent the upstream end 46, of the fluid conduit 28.

FIG. 11 further shows that in a preferred embodiment, the rotary union 10 preferably includes a pair of fluid seals 56, the first fluid seal 58, of the pair of fluid seals 56, engages the external surface 60, of the fluid conduit 28, and is disposed between the first bearing 52, and the downstream end 48, of said fluid conduit 28. The second fluid seal 62, of the pair of fluid seals 56, engages the external surface 60 of the fluid conduit 28, and is disposed between said second bearing 54, and the upstream end 46, of the fluid conduit 28. In a preferred embodiment, the first fluid seal 58 provides the base portion 66, and the first fluid seal restraint 70, which is in pressing contact with the external surface 60 of the fluid conduit 28, abuts against the base portion 66, of the first fluid seal 58, to maintain the relative position of the first fluid seal 58, adjacent the bore surface 86, of the central bore 84; and the second fluid seal 62, provides the base portion 68, and the second fluid seal restraint 72, which is in pressing contact with the external surface 60 of the fluid conduit 28, abuts against the base portion 68, of the second fluid seal 62, to maintain the relative position of the second fluid seal 62, adjacent the bore surface 86, of the central bore 84. In a preferred embodiment, the rotary union housing 76 further provides a fluid distribution chamber 88 (also referred to herein as a fluid chamber 88), which is in fluid communication with the downstream end 48, of the fluid conduit 28. The fluid chamber 88, receives pressurized air from the fluid conduit 28, and transfers the received pressurized air to the tires 12 and 14 (of FIG. 1). Additionally, the rotary union housing 76 provides at least the attachment member 92, which preferably is in mating communication with the attachment aperture 90 of the hubcap 32, and further shows that the fluid conduit 28 provides a fluid communication portion 94, which extends beyond the attachment member 92, and into the interior of said hubcap 32.

In a preferred embodiment, the rotary union 10 preferably includes a bearing sleeve 132, and the bearing sleeve 132, is preferably in pressing contact with the central bore 84, or may be joined to the central bore 84, of the rotary union housing 76, by means of the use of an adhesive, weld, solder, or other mechanical joint techniques, such as through an insert molding process.

Preferably, the pair of bearings 50, each provide an inner race and an outer race, each inner race of the pair of bearings 50, is preferably in direct contact adjacency with the external surface 60, of the fluid conduit 28, while the outer race of each of the pair of bearings 50 are preferably in in pressing communication with the internal surface the bearing sleeve 132. The bearing sleeve may be formed from a, composite material; a metallic material (such as, but not limited to brass, aluminum, stainless steel, iron or steel); or from a polymeric materials (such as, but not limited to nylon, Delran™, phenolic, or Teflon™).

As further shown by FIG. 11, an excess pressure collection chamber 82, is provided by the rotary union housing. The excess pressure collection chamber 82, is preferably adjacent the exterior 34, of the hubcap 32, and serves to accommodate a pressure equalization structure 80. The pressure equalization structure 80, is preferably disposed within the excess pressure collection chamber 82, and in contact adjacency with the exterior 34, of the hubcap 32. As is shown in FIGS. 9 and 11, the mechanical configuration of the cooperation between the pressure equalization structure 80, and the excess pressure collection chamber 82 may take on a plurality of forms.

Figure 12:
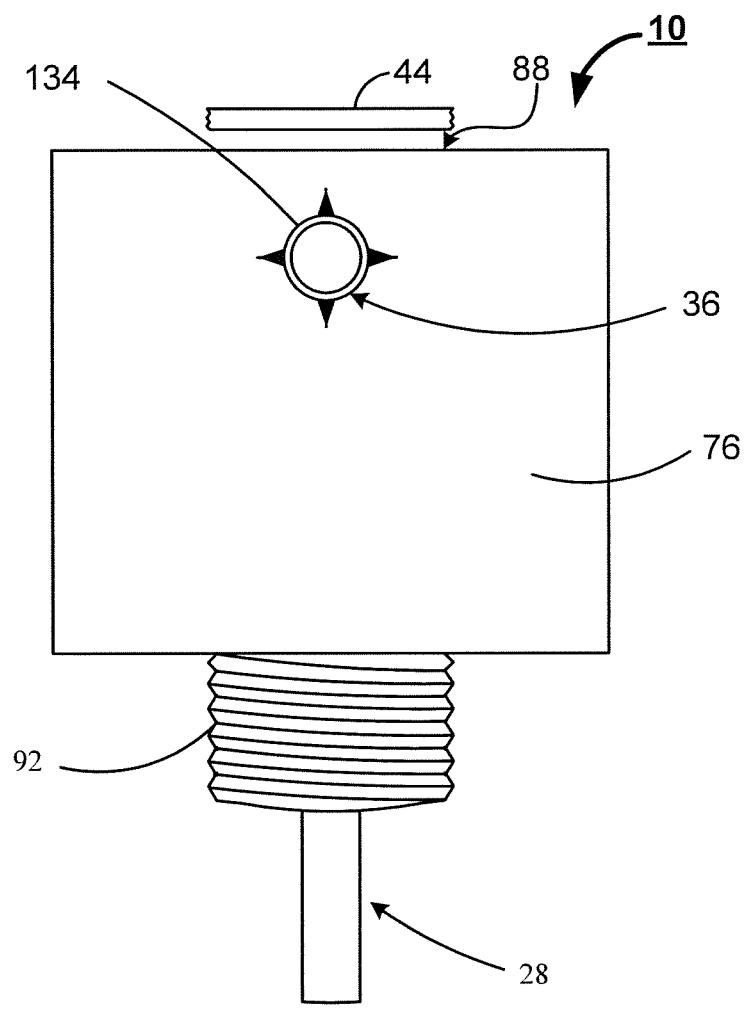
FIG. 12 is a side view in elevation of a rotary union housing formed from a polymer, and providing a threaded insert molded into the polymer rotary housing.

FIG. 12 shows a side view in elevation of a rotary union housing 76, formed from a polymeric materials (such as, but not limited to nylon, Delran™, phenolic, or Teflon™), and providing a threaded insert 134, insert molded into the polymer rotary housing 76, confined within the air delivery channel 36, and in fluidic communication with the fluid chamber 88.

Figure 13:
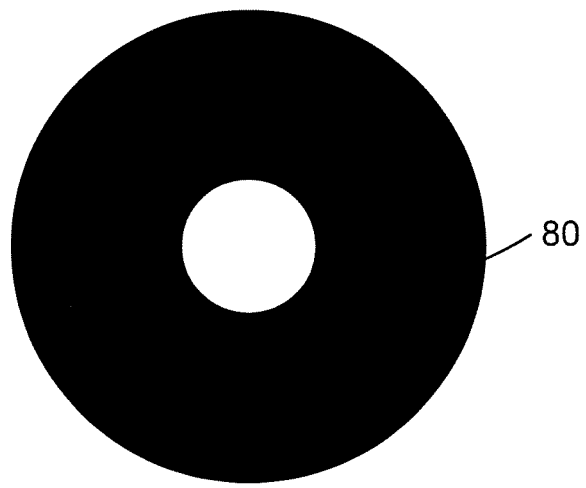
FIG. 13 is a top plan view of a pressure equalization structure of FIG. 11.

FIG. 13 shows a top plan view of the pressure equalization structure 80, of FIG. 11. In a preferred embodiment, of the pressure equalization structure 80 is a filter material (of metal, fiber, or polymer, such as, but not limited to spun bonded polypropylene) as a top layer, and a bottom layer is preferably formed from flashspun high-density polyethylene fibers that promotes the transfer of air, while mitigating the transfer of dirt and water.

Figure 14:
FIG. 14 is a side view in elevation of an embodiment of the pressure equalization structure of FIG. 13.
Figure 15:
FIG. 15 is a side view in elevation of an alternate embodiment of the pressure equalization structure of FIG. 13.
Figure 16:
FIG. 16 is a side view in elevation of an alternative embodiment of the pressure equalization structure of FIG. 13.

FIG. 14 shows a side view in elevation of a preferred component of the bottom layer 136, of the pressure equalization structure 80, of FIG. 13. While FIG. 15 shows a side view in elevation of a preferred component of the top layer 138, of the pressure equalization structure 80, of FIG. 13. And FIG. 16 shows a side view in elevation of a combination 140, of the preferred bottom layer 136, applied to an external surface of the top layer 138.

Figure 17:
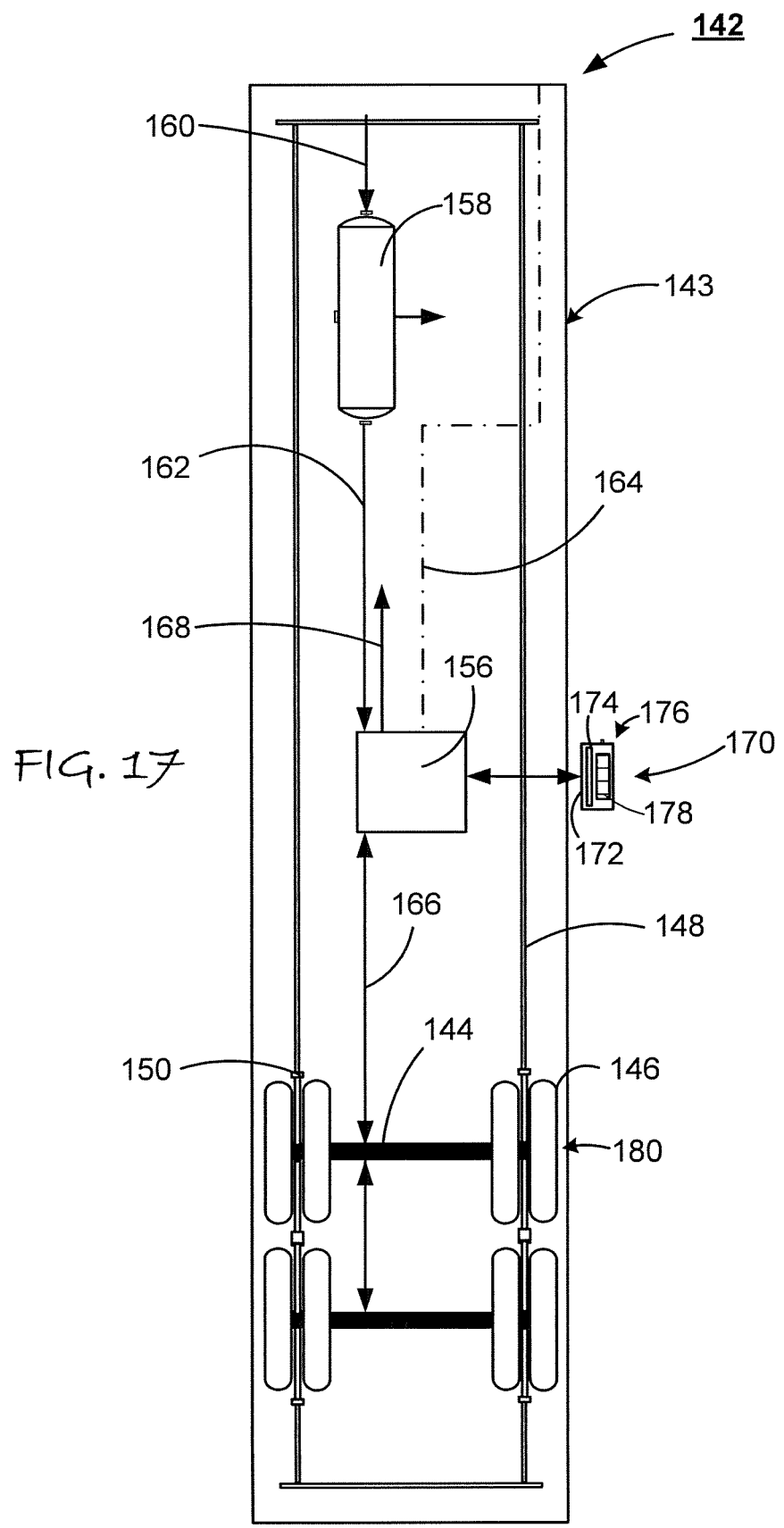
FIG. 17 is a bottom plan view of a trailer, featuring a leaf spring suspension.

FIG. 17 shows a bottom view of a dynamic wheel management system ("DWMS") 142, of the present subject matter. In a preferred embodiment, the DWMS 142 includes at least a trailer 143, supported by an axle 144, the axle 144, housing a pressurized fluid, and supported by a tire 146, and a vehicle frame 148, supported by the axle 144. In a preferred embodiment, a suspension 150, is disposed between and secured to each the vehicle frame 148, and the axle 144. The suspension may take the form of an air suspension system 152 (of FIG. 18), or a leaf spring suspension 154 (of FIGS. 19 and 20).

In a preferred embodiment the DWMS 142, further include: a pressure management controller 156, supported by the vehicle frame 148, and communicating with the tire 146; a load detection device 158 (of FIGS. 19 and 20), interacting with the suspension 150, and communicating with the pressure management controller 156. A further element of the preferred embodiment is a hubcap 32, (of FIG. 11), which is preferable supported by the axle 144, and has an interior 64, and an exterior 34. Preferably, the DWMS 142, further include a rotary union 10 (of FIG. 1), axially aligned with the axle 144, and mounted to the hubcap 32, from the exterior 64, of the hubcap 32. The rotary union 10, preferably including at least a rotary union housing 76 (of FIG. 6). The rotary union housing 76, provides at least a fluid distribution chamber 88 (of FIG. 6), and a central bore 84. The central bore 84, providing an internal surface and a portion of the fluid distribution chamber 88.

FIG. 17 further shows a fluid supply tank 158, which preferably receives a pressurized fluid from a compressor by way of the fluid supply line 160. Preferably, the fluid supply tank 160 provided fluid to the pressure management controller 156, by way of a system supply line 162, and power is supplied to the pressure management controller 156 by way of a power line 164. The pressure management controller 156, preferably manages a fluid pressure in the tire 146 through use of a fluid line 166, which supports a bidirectional fluid flow between the tire 146, and when necessitated, relives tire pressure to the atmosphere through exhaust line 168.

FIG. 17 further shows a system programming device 170, in communication with the pressure management controller 156. In a preferred embodiment, but not by way of a limitation, the system programming device 170, provides: an information input/output circuit 172, which is used to communicate with the pressure management controller 156; an information display screen 174, interacting with the information input/output circuit 172; and an information input device 176, which may be, but is not limited to, a keyboard 178, or a memory information device 180, such as a memory stick.

Figure 18:
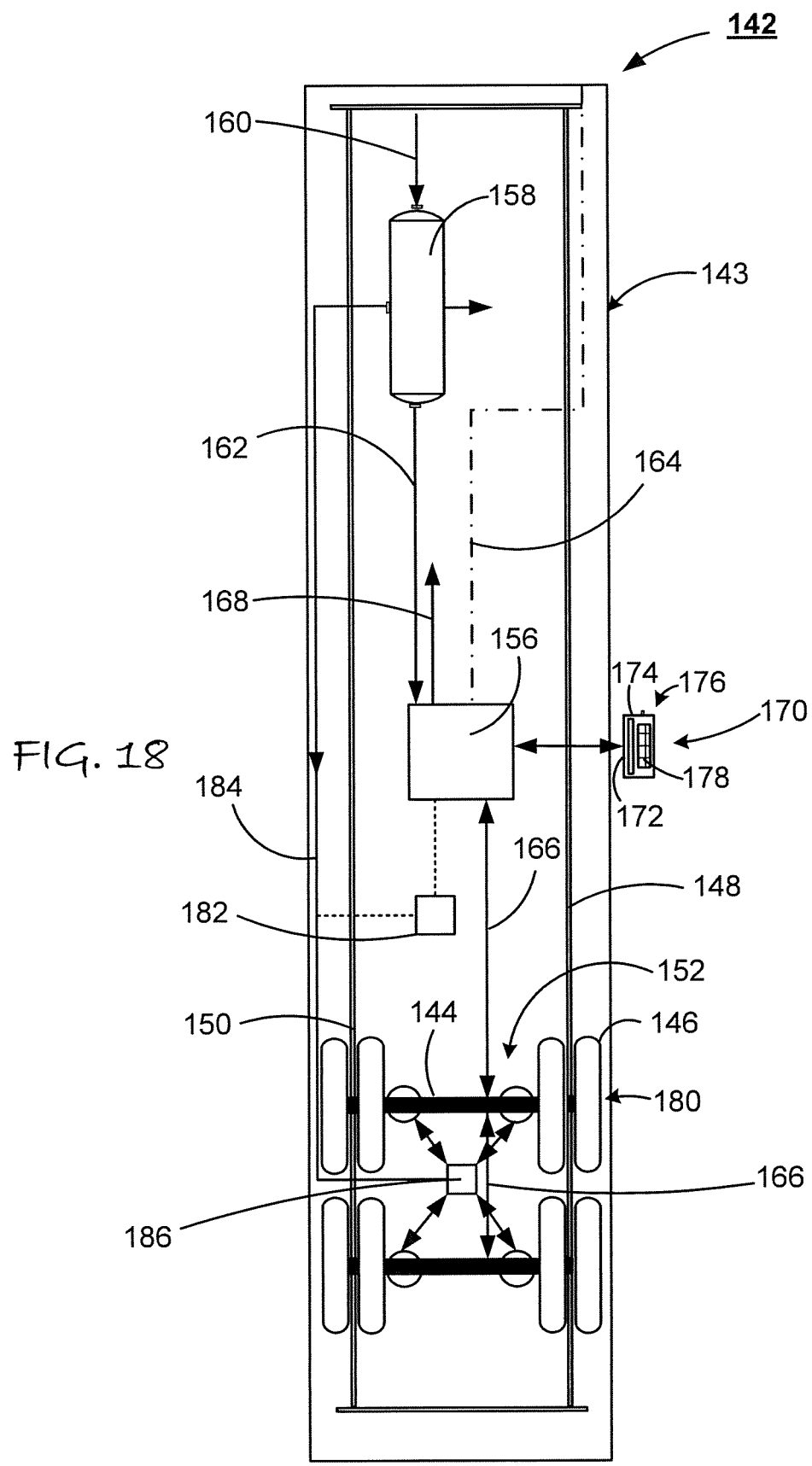
FIG. 18 is a bottom plan view of a tractor trailer, featuring an air bag suspension.

FIG. 18 shows a bottom view of a dynamic wheel management system ("DWMS") 142, of the present subject matter. It differs from FIG. 17 in that it shows an inclusion of a temperature/pressure transducer 182, disposed between, and communicating with, a suspension fluid supply line 184, and an air suspension control device 186. The suspension fluid supply line 184, supplying a fluid to the air suspension control device 186, from the fluid supply tank 158.

Figure 19:
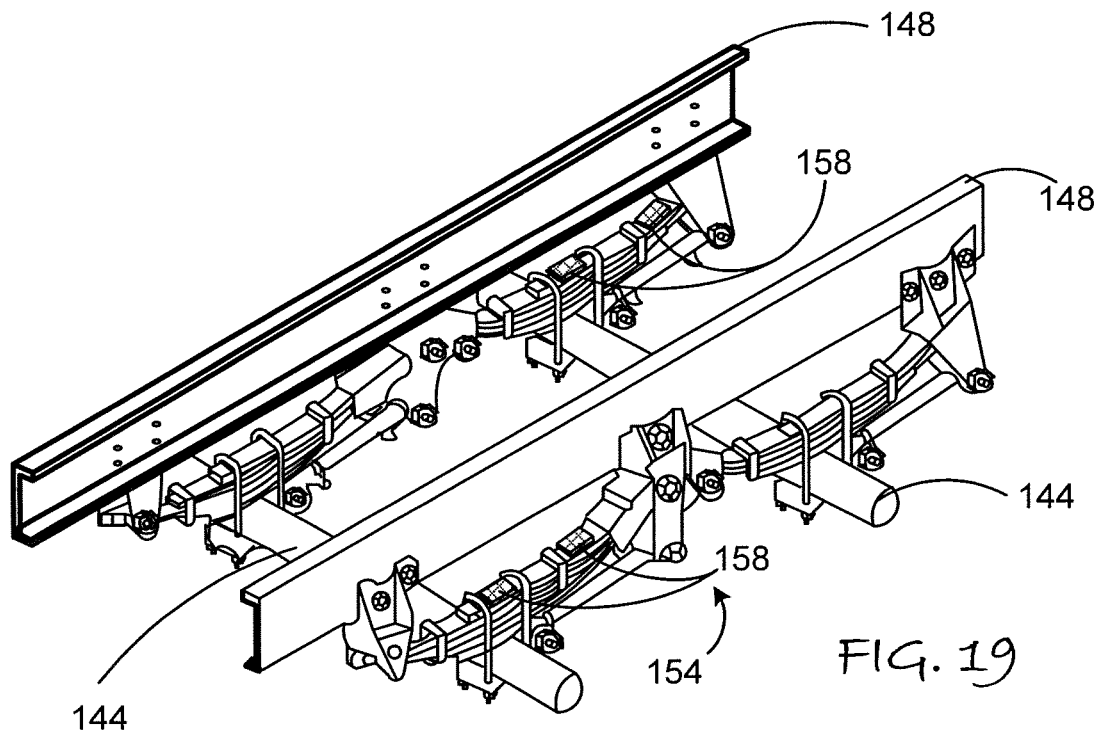
FIG. 19 is a partial view in perspective of the trailer of FIG. 17, showing the leaf springs outfitted with strain gauges.
Figure 20:
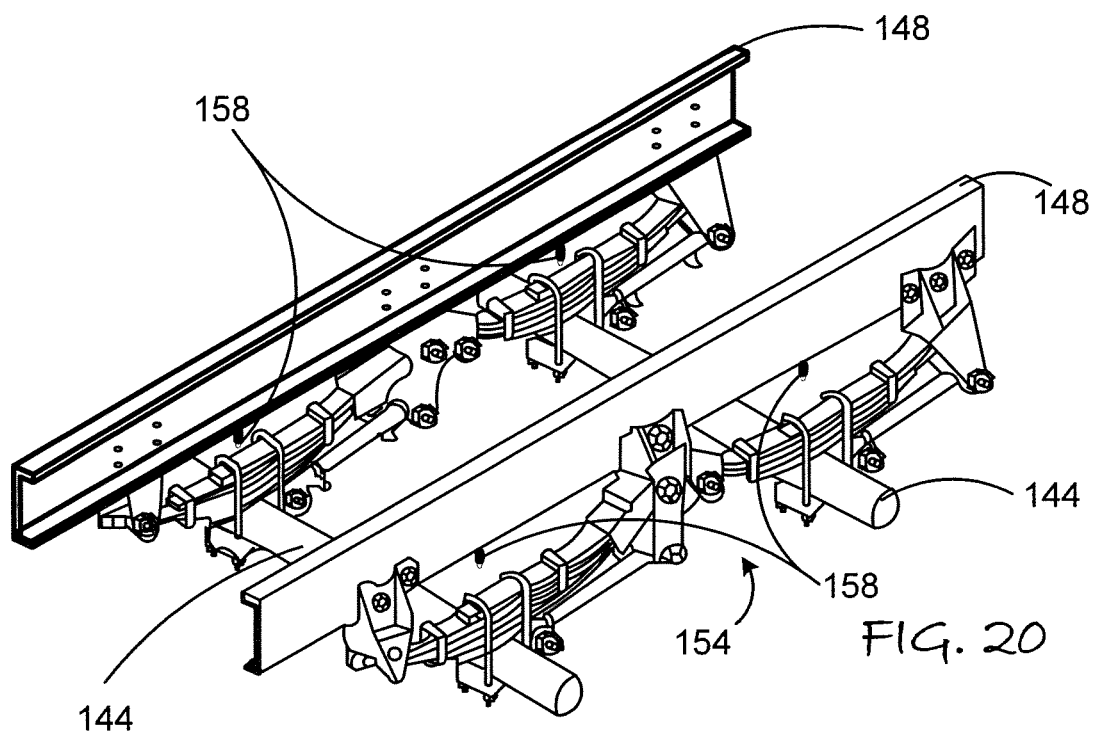
FIG. 20 is a partial view in perspective of the trailer of FIG. 17, showing the leaf springs outfitted with proximity sensors.

FIGS. 19 and 20 show the vehicle frame 148, supported by the axle 144 by way of the suspension 154, and a load detection device 158, which as shown by FIG. 19, is preferably a strain gauge secured to a leaf spring type suspension, and as shown by FIG. 20, the load detection device 158 is a proximity sensor. The proximity sensor, without limitations, may be selected from inductive, capacitive, magnetic, ultrasonic, and photoelectric type sensors. In a preferred embodiment, the proximity sensors are secured to the vehicle frame 148, and communicate with the leaf spring suspension.

Figure 21:
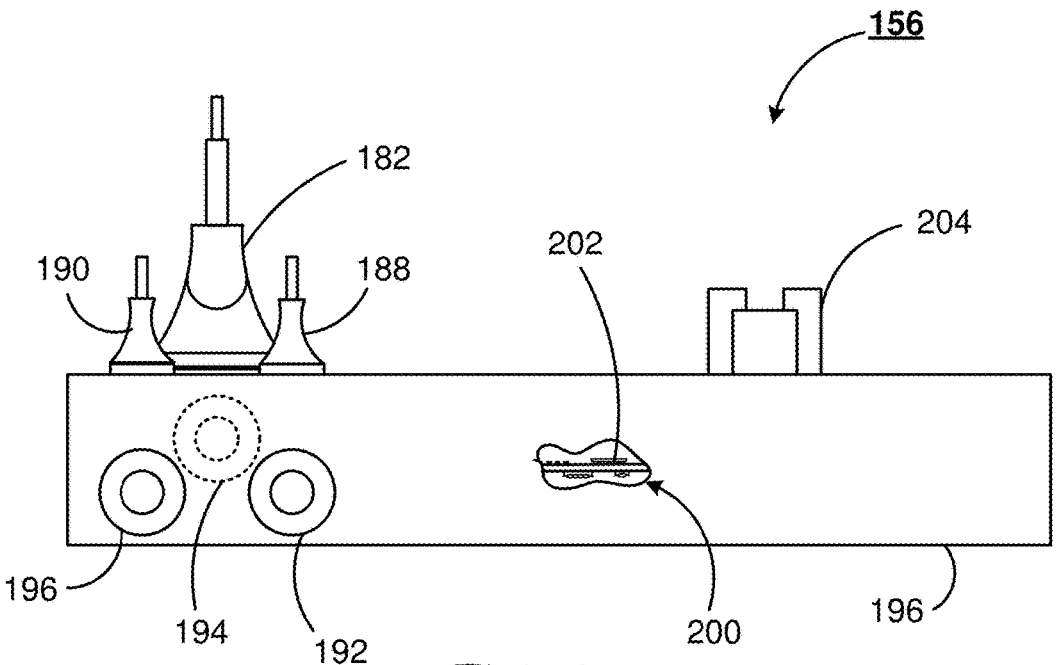
FIG. 21 is a partial cutaway a view in elevation of a pressure management controller of the present dynamic wheel management system.
Figure 37:
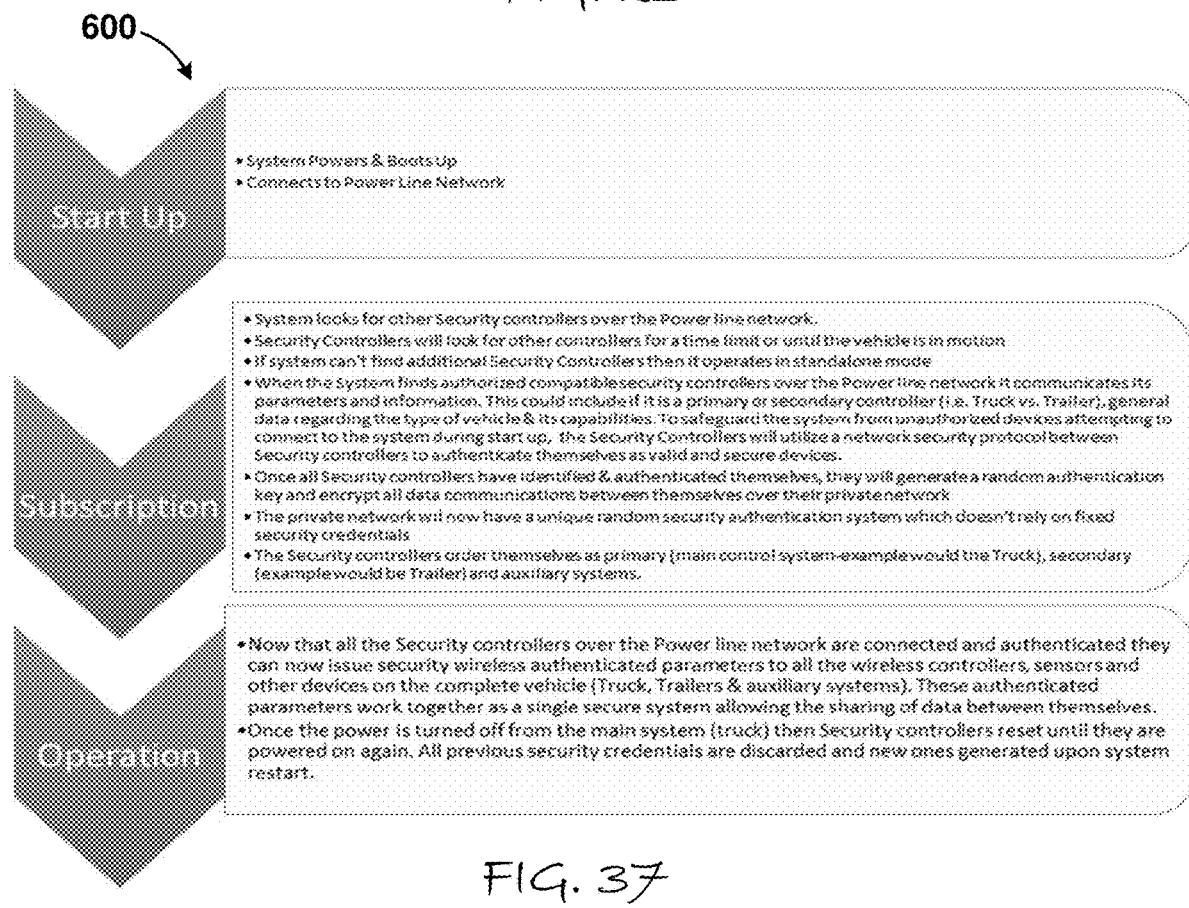
FIG. 37 is a flowchart of example operation of various embodiments of FIGS. 1-36.

FIG. 21, shows the pressure management controller 156, which preferably includes the temperature/pressure transducer 182, a pair of pneumatic piston valves 188 and 190. Pneumatic piston valve 188, cooperates with, and is disposed between, a fluid inlet port 192, and a fluid inflate and deflate port 194 (shown in dashed lines, as the fluid inflate and deflate port 194 is on an opposite side of a confinement structure 196 {also referred to herein as a housing 196}, than is the fluid inlet port 192). The fluid inflate and deflate port 194 interacts with the tire 146 to either provide fluid to the tire 146, when the tire 146 requires inflation, or when the tire requires deflation, to maintain the tire pressure at a desired value.

Pneumatic piston valve 190, cooperates with, and is disposed between, a fluid exhaust port 198, and the fluid inflate and deflate port 194. When a deflation of tire 146 is needed to maintain the fluid pressure at a desired level, fluid from the tire 146 flows through the fluid inflate and deflate port 194, and the pneumatic piston valve 190, to the exhaust port 198, where it is released to atmosphere.

FIG. 21 further shows that the housing 196, further houses a control electronics assembly 200, which receives input from the temperature/pressure transducer 182, and utilizes that input, in conjunction control logic loaded into a central processing unit ("CPU") 202 to manage the pressure in the tire 146, to maintain the fluid pressure within the tire 146, at the desired level. In a preferred embodiment, control logic contained within the CPU 202, is provided by the system programming device 170 (of FIG. 12).

The housing 196, further preferably supports a power/data/controller area network ("CAN") connector 204. The power/data/CAN connector 204, preferably receives power from the power line 164 (of FIG. 12), receives input from the system programming device 170, when the system programming device 170 is communicating with the CPU 202, and provides output data from the CPU 202 by way of the CAN connection of the power/data/CAN connector 204.

Figure 22:
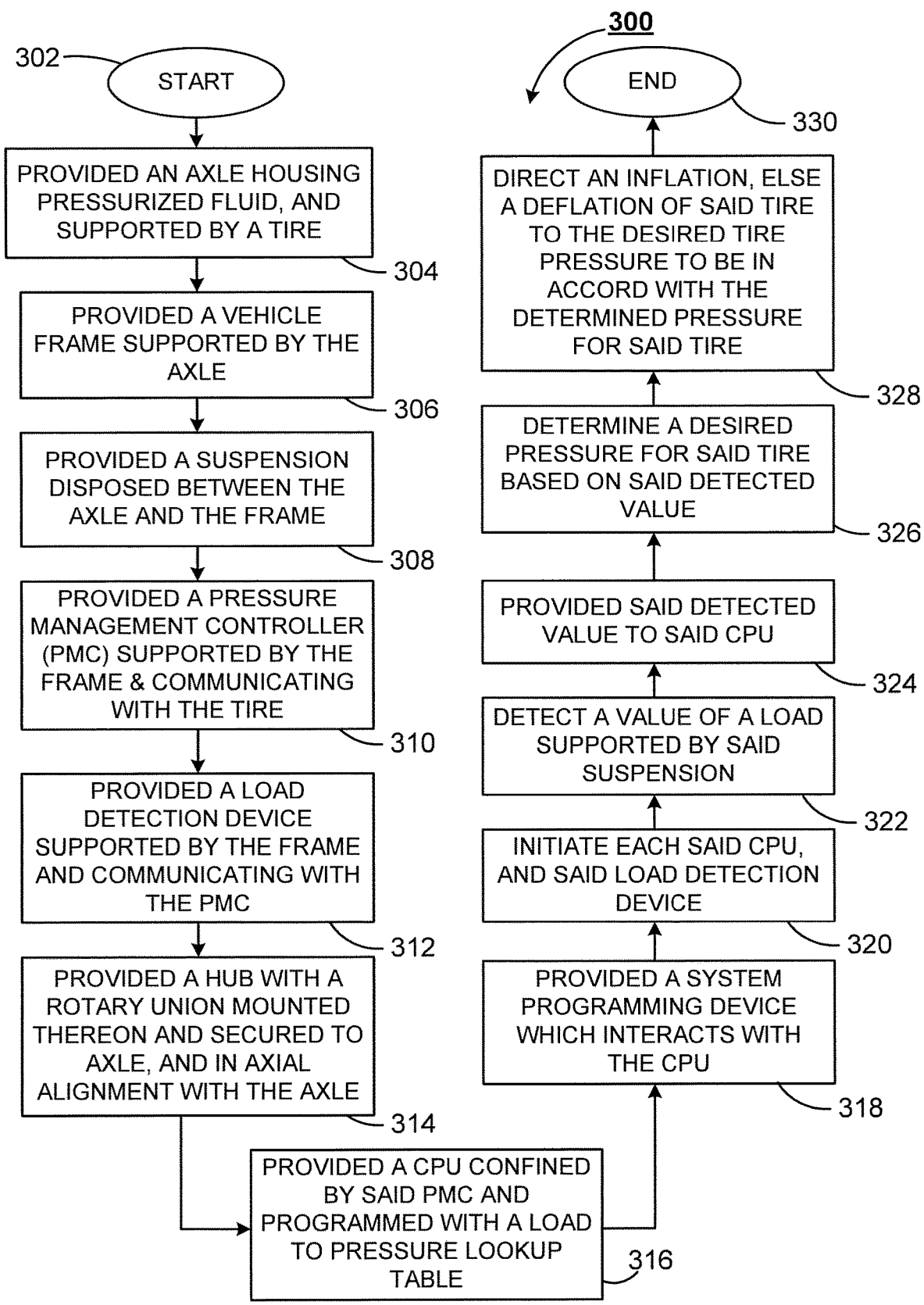
FIG. 22 is a flow diagram of a method of using the present dynamic wheel management system.

FIG. 22, is a flow diagram 300, of a method of using the present dynamic wheel management system 142 (of FIG. 17). The method begins at start step 302, and continues process step 304, at which an axle (such as 16, of FIG. 1) is provided. The axle (such as 144 of FIG. 17), preferably supported by an frame (such as 148 of FIG. 17), houses a pressurized fluid, in which the axle itself may confine the pressurized fluid, or the axle may house an air supply line (such as 18, of FIG. 1) that in turn confines the pressurized fluid. The axle is preferably supported by a tire (such as 146, of FIG. 17. At process step 304, a vehicle frame (such as 148, of FIG. 17) is provided, which in a preferred embodiment, is supported by the axle, and at process step 306, a suspension (such as air suspension system 152 (of FIG. 18), or a leaf spring suspension 154 (of FIGS. 19 and 20)) is provided. In a preferred embodiment, the suspension is disposed between the vehicle frame and the axle.

At process step 310, a pressure management controller ("PMC") (such as 156, of FIG. 18) is provided. In a preferred embodiment, the PMC is supported by the frame and communicates with the tire. While at process step 312, a load detection device (such as 154, of FIGS. 19 and 20) is provided. Preferably, the load detection device is supported by the frame, detects changes in the suspension, which is in response to loads being placed in the vehicle, and communicates those changes to the CPU, which is provided in process step 315, and is preferably confined by the PMC. The CPU analyses the communication from the load detection device and determines a desired pressure for the tire.

At process step 314, a hub, with a rotary union (such as 10, of FIG. 11) mounted thereto, is provided. In a preferred embodiment, the hub is mounted to the axle, and the rotary union is preferably positioned in axial alignment with the axis of the axle. At process step 318, a system programming device (such as 170, of FIG. 18) is provides. In a preferred embodiment, the system programming device is, when connected to the PMC, is utilized to up load operational software, and data used by the PMC during active operation of the PMC.

At process step 320, both the CPU and the load detection device is initiated. At process step 322, the load detection device determines the condition of the suspension, and generates a value. And at process step 324, the load detection device provides that value to the CPU. Again, the value provided is reflective of a load being supported by the suspension. At process step 326, the CPU determines a pressure value for use in the tire, based on the value detected and provided by the load detection device.

At process step 328, the PMC directs an inflation else a deflation of the tire to the desired pressure level for the tire, based on and in accordance with, the determined pressure value, and the process concludes at end process step 330.

Figure 23:
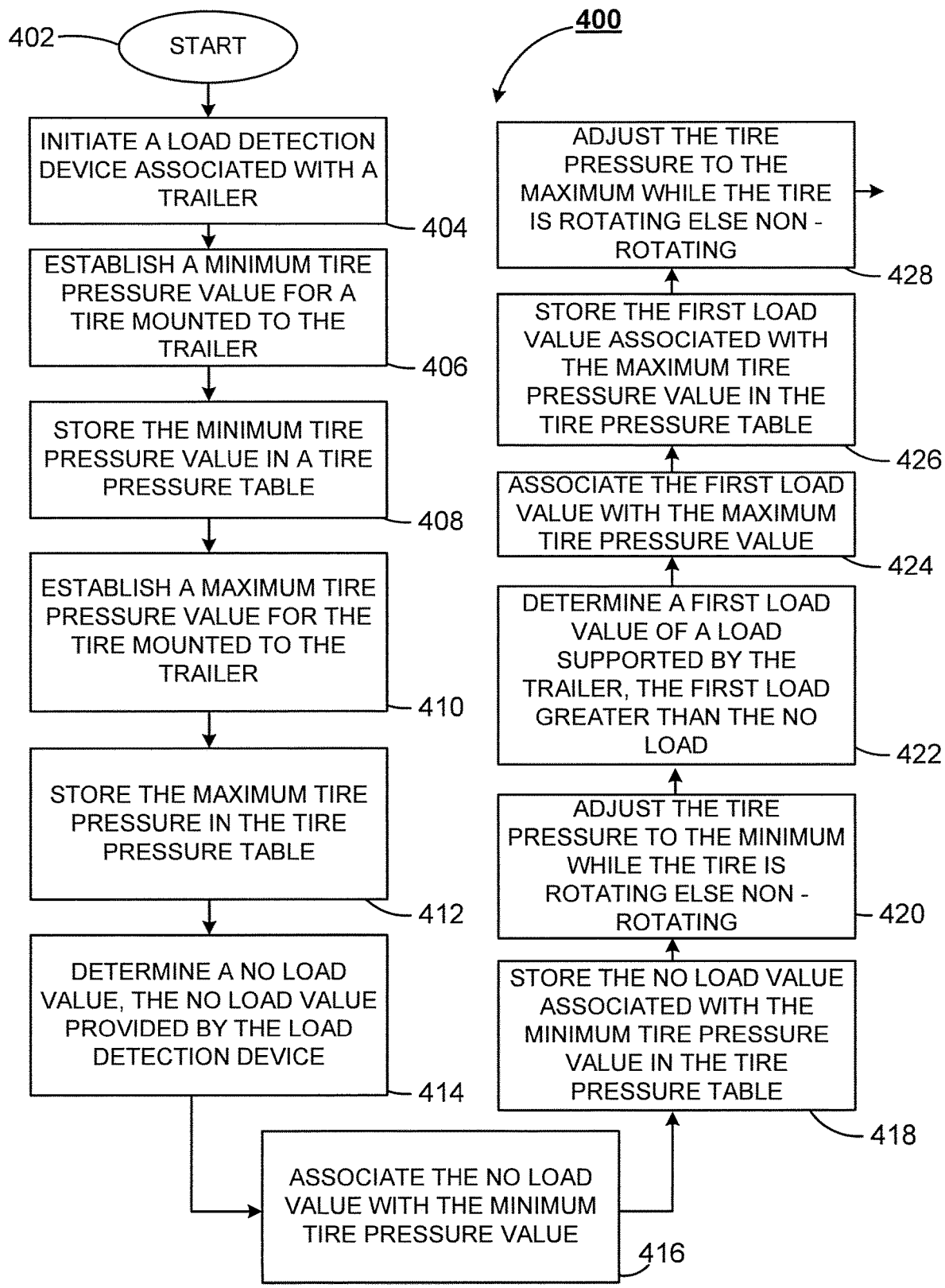
FIG. 23 is a flow diagram of a method of producing and using a tire pressure table of the present dynamic wheel management system.
Figure 24:
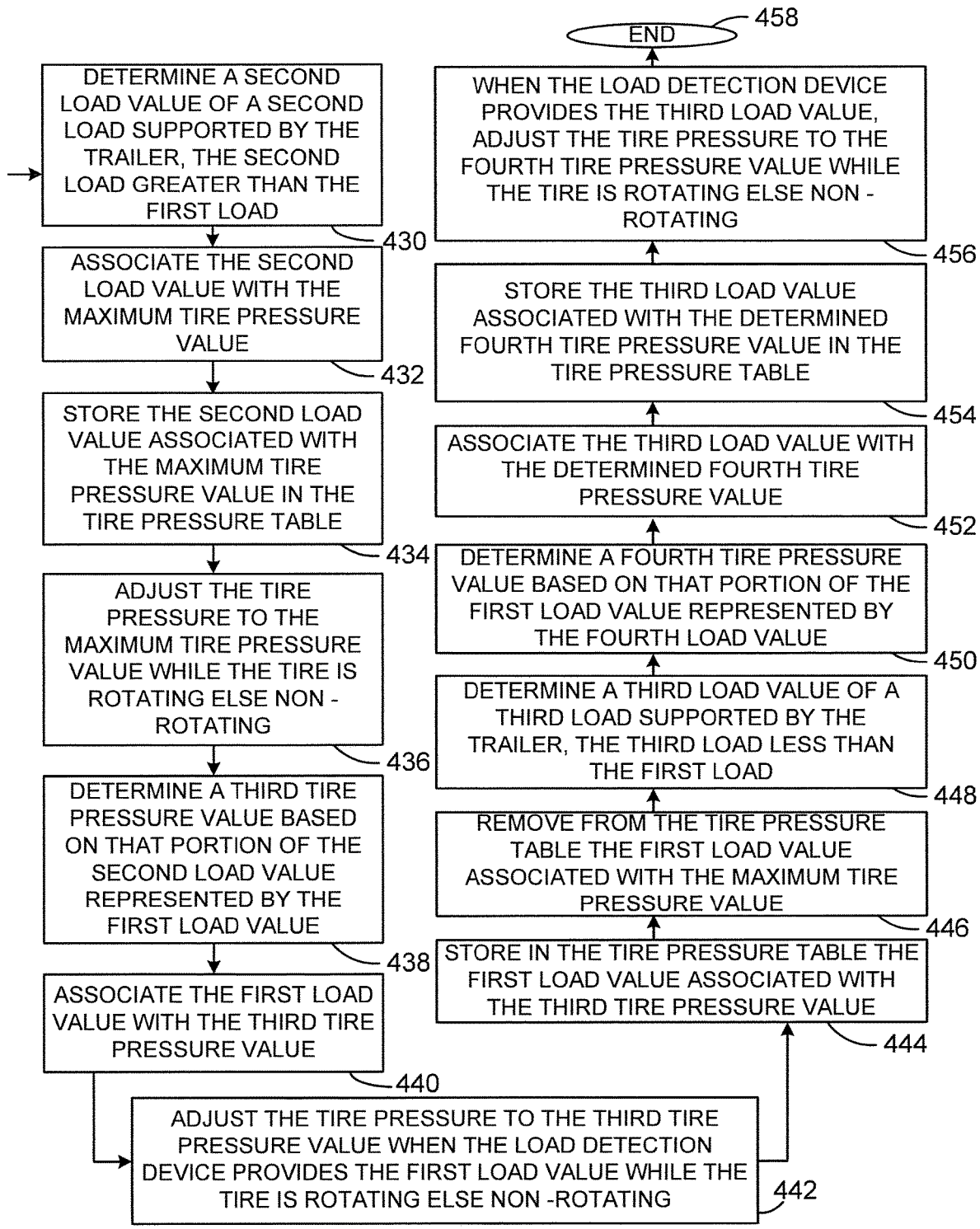
FIG. 24 is continuation of the flow diagram of a method of producing and using a tire pressure table of the present dynamic wheel management system of FIG. 23.

FIGS. 23 and 24, show a flow diagram of a process 400, of using the present dynamic wheel management system ("DWMS") (such as 142, of FIGS. 17 and 18). Process 400 commences at start step 402, and continues with process step 404. At process step 404 a load detection device associated with a vehicle (also referred to herein as trailer, of DWMS 142).

The process preferably continues at process step 406, a minimum tire pressure value is established for a tire mounted to the trailer. At process step 408, the minimum tire pressure is stored in a tire pressure table (also referred to herein as a tire table) contained within a CPU (such as 202, of FIG. 21), confined within a housing (such as 196, of FIG. 21), of a PMC (such as 156, of FIG. 21). At process step 410, a maximum tire pressure value for the tire is established, and stored in the tire table contained within the CPU at process step 412.

At process step 414, a no load value is determined by the load detection device, and associated with the minimum tire pressure value in the tire table at process strep 416, and further stored within the tire table at process step 418. At process step 420, the tire pressure is adjusted to comply with the minimum tire pressure when the no load value is provided to the CPU. Adjustment of the tire pressure may occur while the tire is rotating, or non-rotating.

At process step 422 a first load value, reflective of a first load being loaded on the trailer and supported by the suspension of the trailer, is determined, wherein the first load is greater in weight than the no load condition. At process step 424, the first load value is associated with the maximum tire pressure value, stored in the tire table of the CPU at process step 426, and at process step 428, the tire pressure is adjusted to comply with the maximum tire pressure when the first load value is provided to the CPU. Adjustment of the tire pressure may occur while the tire is rotating, or non-rotating.

The process continues with process step 430, of FIG. 24. At process step 430, a second load value is determined for a second load supported by the trailer, in which the second load is greater than the first load. At process step 432, the second load value is associated with the maximum tire pressure value, stored in the tire table at process step 434, and at process step 436, the tire pressure is adjusted to comply with the maximum tire pressure when the second load value is provided to the CPU. Adjustment of the tire pressure may occur while the tire is rotating, or non-rotating.

At process step 438, a third tire pressure is calculated by the CPU, based on that portion of second load value represented by the first load value. At process step 440, the first load value is associated with the determined third tire pressure value, stored in the tire table at process step 444, and at process step 442, and at process step 442 the tire pressure is adjusted to comply with the determined third tire pressure value, when the load detected by the load detection device provides the first load value to the CPU. Adjustment of the tire pressure may occur while the tire is rotating, or non-rotating. And at process step 446, the first load value associated with the maximum tire pressure is removed from the tire table.

At process step 448, a third load value of a third load is determined, wherein the weight of third load is less than the first load. At process step 450, a fourth tire pressure value, based on that portion of the first load value represented by the fourth load value, is determined by the CPU. At process step 452, the third load value is associated with the determined fourth pressure value, stored in the tire table at process step 454, and at process step 456, the tire pressure is adjusted to comply with the determined fourth tire pressure value, when the load detected by the load detection device provides the third load value to the CPU. Adjustment of the tire pressure may occur while the tire is rotating, or non-rotating. And the process concludes at process step 458.

Figure 25:
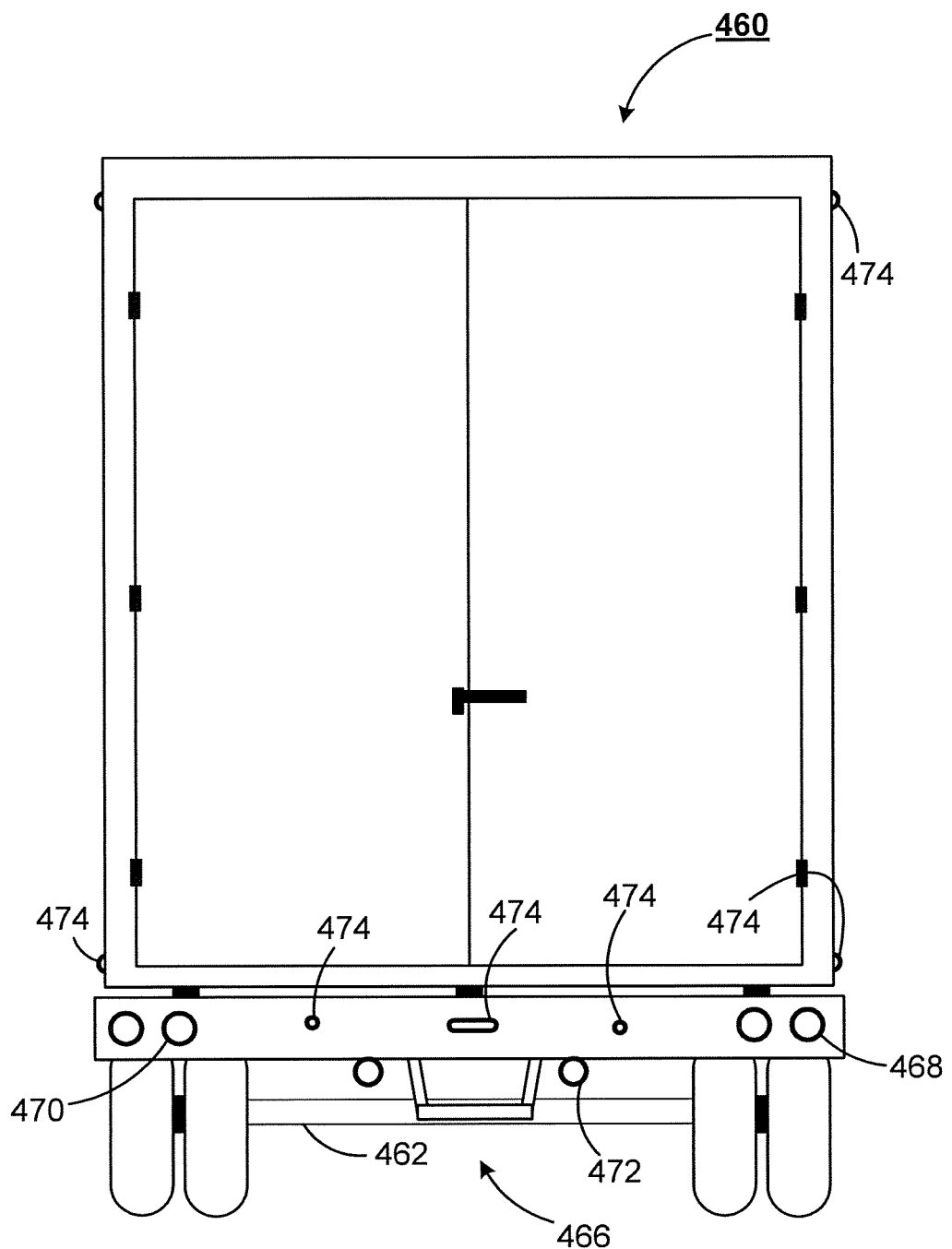
FIG. 25 is a rear view in elevation of a semi-trailer.

FIG. 25 shows a rear view in elevation of a semi-trailer 460, which preferably includes at least an axle 462, supporting a vehicle frame 148, a suspension 152 (of FIG. 18), or a leaf spring suspension 154 (of FIGS. 19 and 20), disposed between and secured to each the vehicle frame 148, and the axle 462. FIG. 25, further shows a load detection device 158 (of FIGS. 19 and 20), interacting with the suspension (152, 154), and communicating with a system controller 464 (of FIG. 26), the system controller 464 is preferable supported by the vehicle frame 148.

Still further, FIG. 25 shows a vehicle operational lighting system 466, supported by the frame 148, and communicating with the system controller 464. The vehicle operational lighting system 464, is activated by the system controller 464, in response to load detection data received by the system controller 464, from the load detection device 158. In a preferred embodiment, the vehicle operational lighting system 466, includes at least a brake light 468, supported by the vehicle frame 148, a turn signal 470, supported by the vehicle frame 148, and a backup light 472, supported by the vehicle frame 148. Additionally, FIG. 25 shows a running light 474, supported by the vehicle frame 148, wherein the operational condition of each the brake light 468, turn signal 470, backup light 472, and running light 474 is verified, to be functioning properly by the system controller 464.

In a preferred embodiment, the running light 474, is flashed by the system controller 464, when a load supported by the vehicle frame 148, is detected, by the load detection device 158, to impart an imbalance condition on the suspension (152, 154). In an alternate preferred embodiment, the backup light 472, is flashed by the system controller 464, when a load supported by the vehicle frame 148, is detected, by the load detection device 158, to impart an imbalance condition on the suspension (152, 154). In an alternative preferred embodiment, the turn signal 470, is flashed by the system controller 464, when a load supported by the vehicle frame 148, is detected, by the load detection device 158, to impart an imbalance condition on the suspension (152, 154). In an alternate, alternative embodiment, the brake light 468, is flashed by the system controller 464, when a load supported by the vehicle frame 148, is detected, by the load detection device 158, to impart an imbalance condition on the suspension (152, 154).

It will be recognized by those skilled in the art, that any combination of the brake light 468, turn signal 470, backup light 472, and running light 474 may be used in unison, or in any combination, to inform the condition the load imparts on the suspension (152, 154), i.e., weather the load is improperly fore or aft, port or starboard, relative to the suspension (152, 154).

Figure 26:
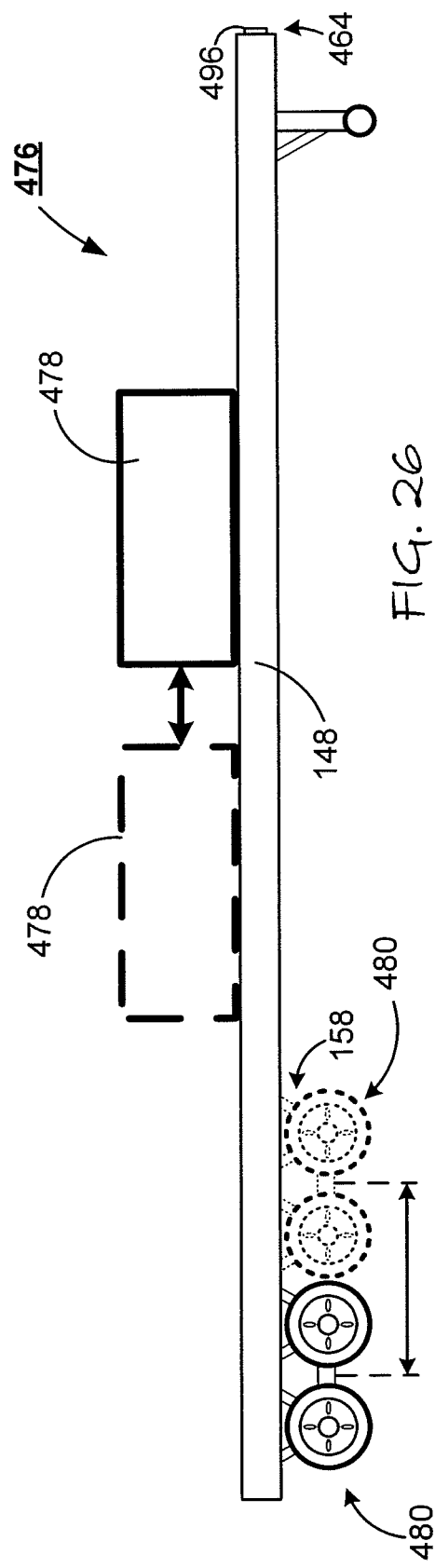
FIG. 26 is a side view in elevation of a flatbed semi-trailer.

FIG. 26 shows an embodiment of a side view, in elevation, of a flatbed semi-trailer 476, having the vehicle frame 148, supporting a load 478, and the vehicle frame 148, supported by a tire, wheel, axle, and suspension assembly 480 (also referred to as suspension assembly 480). In this embodiment, the load 478, an imbalance load condition may be resolved by shifting the load 478, relative to the suspension assembly 480, (such as shifting the load 478 in the direction of the suspension assembly 480, as shown by FIG. 26). Or, by repositioning the suspension assembly 480, relative to the load 478, (such as repositioning the suspension assembly 480, in the direction of the load 478, as shown by FIG. 26).

Figure 27:
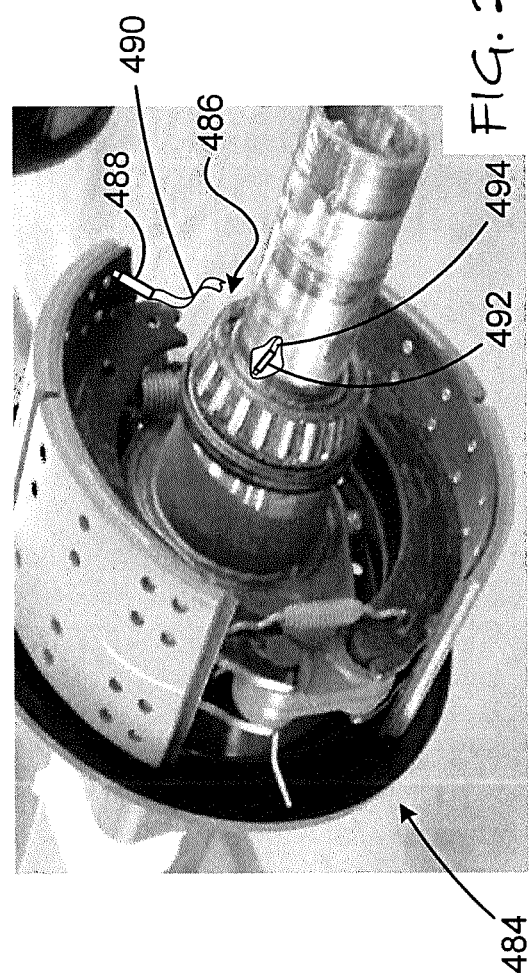
FIG. 27 is a perspective view of an axle with accompanying brake assembly, and bearing of the semi-trailer of FIG. 25.

FIG. 27 shows a perspective view of an axle 482, with accompanying brake assembly 484, and bearing 486, of the suspension assembly 480, of the flatbed trailer semi-trailer 476, of FIG. 26. In a preferred embodiment a sensor 488, attached to a communication line 490, and positioned adjacent the brake assembly 484, detects a condition of the break assembly 484, and relays that detected condition to the system controller 464 (of FIG. 26). The preferred embodiment further shows a sensor 492, positioned adjacent the bearing 486, and attached to a communication line 494, detects a condition of the bearing 486, and relays that detected condition to the system controller 464 (of FIG. 26). Preferably, the condition being detected by each sensor (488, 492) is heat. However, other conditions could include vibration, and of the ware of the components. For example, the sensor 488, can be incorporated in the brake shoe, to detect an amount of ware sustained by the brake pad.

Figure 28:
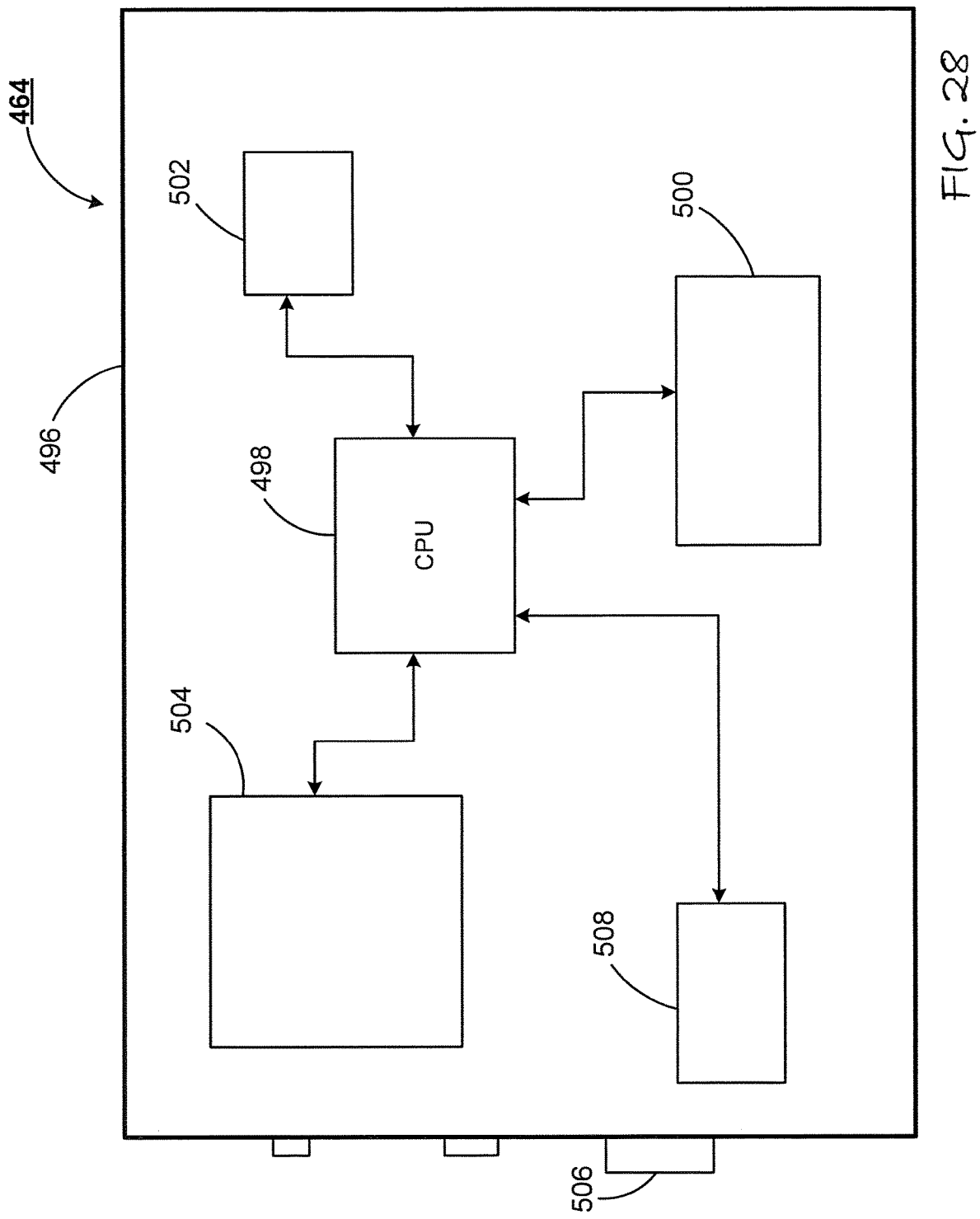
FIG. 28 is block diagram of a system controller of the semi-trailer of FIG. 26.

FIG. 28 illustrates a block diagram of the system controller 446, of the flatbed semi-trailer 476, of FIG. 26. In a preferred embodiment, the system controller 464, includes at least, but is not limited to, a system controller housing 496, (of FIG. 26) supported by the vehicle frame 148 (of FIG. 26), and housing a central processing unit ("CPU") 498. FIG. 28, further shows: a modem 500, confined within the controller housing 496, and communicating with the CPU 498; controller area network support electronics ("CAN") 502, confined within the controller housing 496, and communicating with the CPU 498; a wireless communication circuit 504, confined within the controller housing 496, and communicating with the CPU 498; a communication interface connector 506, supported by the controller housing 496, and communicating with the CPU 498; and a global positioning system 508, confined within the controller housing and communicating with the second CPU.

In a preferred embodiment, the system controller 464, is an embedded ARM computer with built-in connectivity to the Cloud and the Pneumatics & Sensors on the Truck and/or Trailer. The System controller 464 performs several critical functions such as device connectivity (Cloud, Mobile Devices & vehicle), protocol translation (Analog Sensors, Digital Sensors, Wireless protocols, RFID & etc.), data filtering and processing, security, system updating, data management and more. The System controller 464 also operates as a platform for application code that processes data and becomes an intelligent wheel management system. This includes operation of the Pneumatics system for Tire Pressure Management as well as data collection and event notifications. The System controller 464 application software performs the following functions: controls all trailer tire pressures as one; controls trailer tire pressures by pair (by tire if SS); controls trailer tire pressures individually; controls truck drive tire pressures by pair (by tire if SS); controls truck steer tire pressures; measures axle weight; measures trailer weight; measures truck weight; relative weight measurement accuracy; measures bearing temperature; measures brake temperature; measures other OOS violation causes; transmits meta data; transmits bulk data; cloud derived alerts for current conditions of monitored systems; cloud derived alerts for prediction conditions of monitored systems; other cloud services; smart phone GUI w/interface by Bluetooth; smart phone GUI w/interface by cloud; web connection by cloud; web API, and cloud stored load tables.

Besides these types of applications, the system controller 464, will has the ability to add new software features and applications, and to add new & approved functionality. In a preferred embodiment, the system controller 464, is configured with a network connection to the system via 3G/4G or wired. Additionally, there is a Mobile Application that operates on an Android based Smartphone or Apple iPhone. Preferably, the system controller 464, Mobile Application also supports Android Tablets or Apple iPads. The Mobile Application allows the configuration, programing, diagnostics and user setup of the system controller 464.

The system controller 464, configuration includes at least, but is not limited to the following: 3G/4G Modem Setup (Dial up connection number and Test) and (Schedules and Event Connectivity); CAN Address (Connect to CAN based Sensors such as the Parker Sensor for Weight), (Configure and Calibrate any sensors coming from the CAN network), and (Program connectivity and security parameters); Wireless Radios, including, but not limited to: WiFi (802.11ae)—(Off/On . . . Connected Vehicle WiFi Network . . . Name and connect to the appropriate software service . . . Test configuration); BLE (Bluetooth)—(Off/On . . . Connected Vehicle WiFi Network . . . Name and connect to the appropriate software service . . . Test configuration); 802.15.4 Zigbee—(Off/On . . . Connected to Zigbee enable sensors . . . Polling Schedules (Connectivity based on type of Sensor) . . . Name and connect to the appropriate software service . . . Test configuration; 433 Mhz RFID—

(Off/On . . . Connected to 433 Mhz RFID Sensors . . . Name and connect to the appropriate software service . . . Test configuration); Wired Connections—Analog Sensors (Enter default valves and ranges for the Analog Sensor . . . Enter the type of sensor and wired location . . . Name and connect to the appropriate software service . . . Test configuration); USB and Serial Connections—(Enter Port #, Bit format, Parity and Speed . . . Type of Sensor and default data ranges . . . Name and connected to the serial device . . . Connect to the appropriate software service . . . Test the configuration); and GPS—Test GPS and Data & Time.

Figure 29:
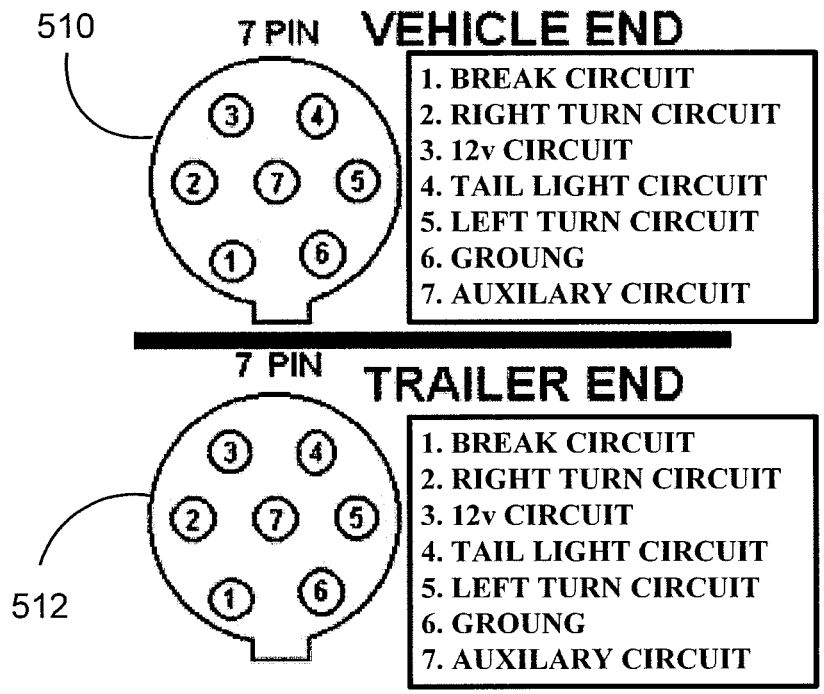
FIG. 29 shows a schematic of a power connector for a semi-tractor/trailer combination.

In a further embodiment of the present invention, a vehicle pairing system and methodology is provided. The pairing system is initiated when a power connector of a semi-tractor, such as a semi-tractor power connector 510, of FIG. 29, is united with a power connector of a semi-trailer, such as semi-trailer power connector 512, of FIG. 29.

Figure 30:
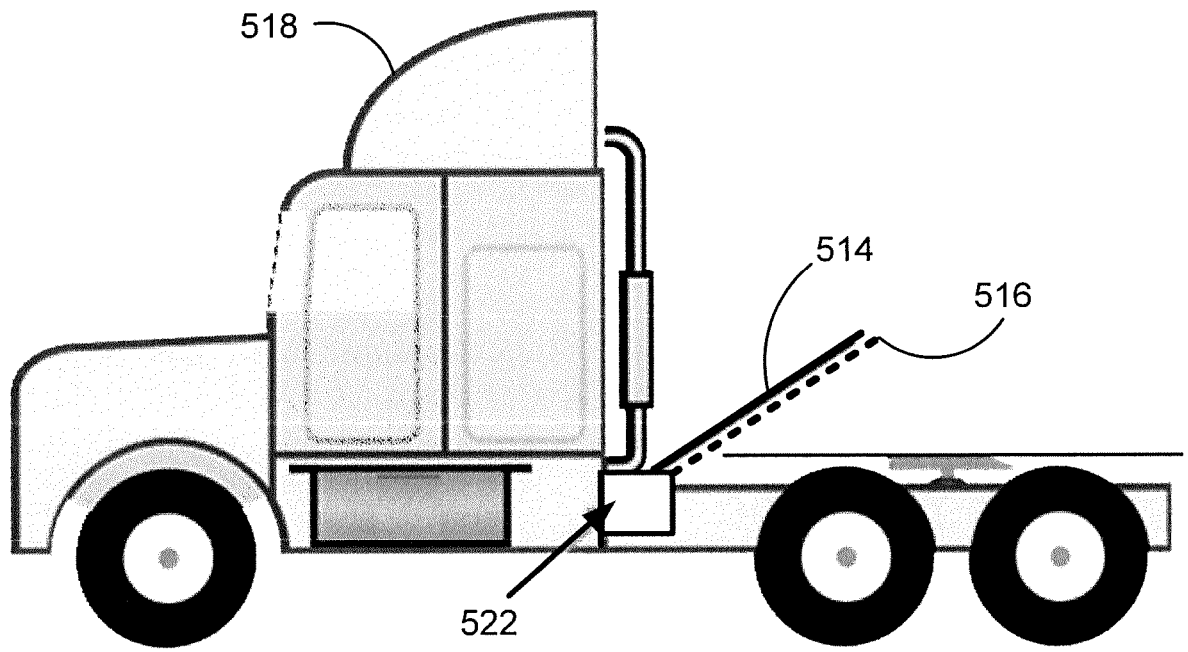
FIG. 30 shows a view in elevation of a semi-tractor of a semi-tractor/trailer combination with a tractor system control unit supported by the semi-tractor.
Figure 31:
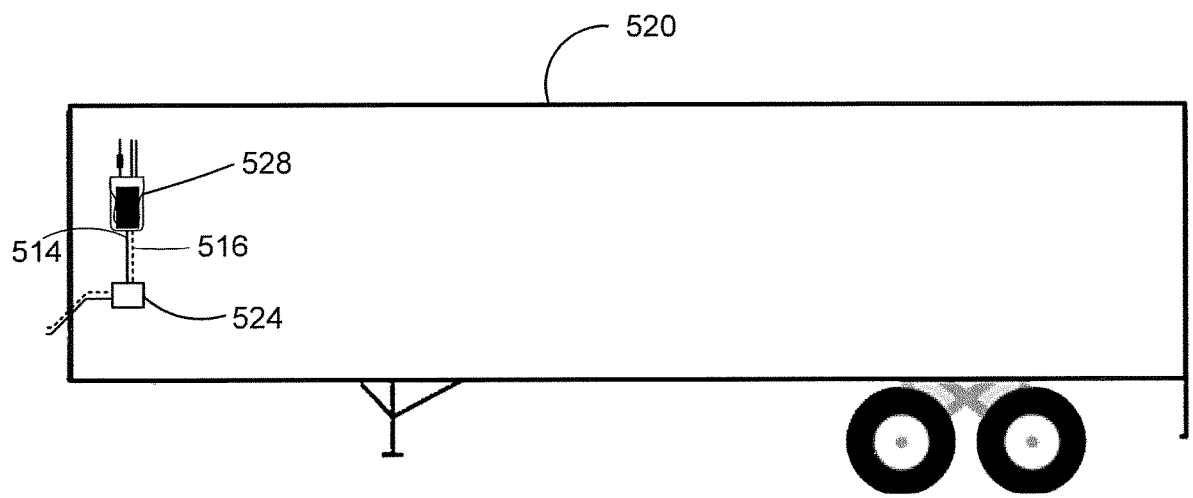
FIG. 31 shows a view in elevation of a semi-trailer of the semi-tractor/trailer combination with a trailer system control unit supported by the semi-trailer.

FIG. 30, shows both power and data lines, 514 and 516 respectively, of semi-tractor 518, for use in initializing paring of the semi-tractor 518 to a semi-trailer 520, of FIG. 31. Upon connection of power connector 510 with power connector 512, a first system controller, such as 522, of the semi-tractor 518, both of FIG. 30, provides pairing process initiation data to a second system controller, such as 524, of a semi-trailer 520, both of FIG. 31. Included in the pairing process initiation data is a randomly selected, unique, identification code assigned to the semi-trailer 520, this unique code is then utilized, and associated with the semi-trailer 520, as a basis for all further communications between the semi-tractor/trailer combination 526, of FIG. 32. In a preferred embodiment, the pairing process initiation data is transmitted via hard wire, i.e., the pairing process initiation data is transmitted by way of: the auxiliary circuit 7, of FIG. 29; or the ground connection 6, of FIG. 29; or the 12v power connection 3, of FIG. 29, or a combination thereof. Most preferably, the auxiliary circuit 7, of FIG. 29, is used for ongoing, hard wire, data transfer between the system controllers 522 and 524, of the semi-tractor/trailer combination 526, of FIG. 32. Further shown by FIG. 31, is a wireless control unit 528. Data from the semi-tractor 518 is transmitted, for example, over the 12v circuit 3, of FIG. 29, to the wireless control unit 528 and the second control system 524. The data will preferably include necessary sensor and wireless security protocols, or private key, to connect wirelessly, the semi-tractor 518, with the semi-trailer 520. At that point, the semi-tractor/trailer combination 526, have a closed wired and wireless network forming the pairing system 527. Preferably, the wireless control unit 528, in addition to providing a wireless network for of the semi-tractor/trailer combination 526, the wireless control unit 528, further provides communication capabilities to devices external to the semi-tractor/trailer combination 526.

In a preferred embodiment, during the pairing process, the Truck provides a secure private security key (also referred to herein as a private key) that can be shared by all the wireless devices connected on the semi-tractor/trailer combination 526. This allows all the wireless technologies to pair up as a system without having to broadcast their identities & pairing options over the open network, which eliminates the issues of trucks or trailers pairing with the wrong vehicles. Another benefit is when the truck or trailer are turned off the secure private key would no longer be valid. A new key is generated upon the startup of the semi-truck 518, or the reconfiguration of the semi-tractor/trailer combination 526, which assures a new and different security key every time the semi-truck 518 is started.

Figure 32:
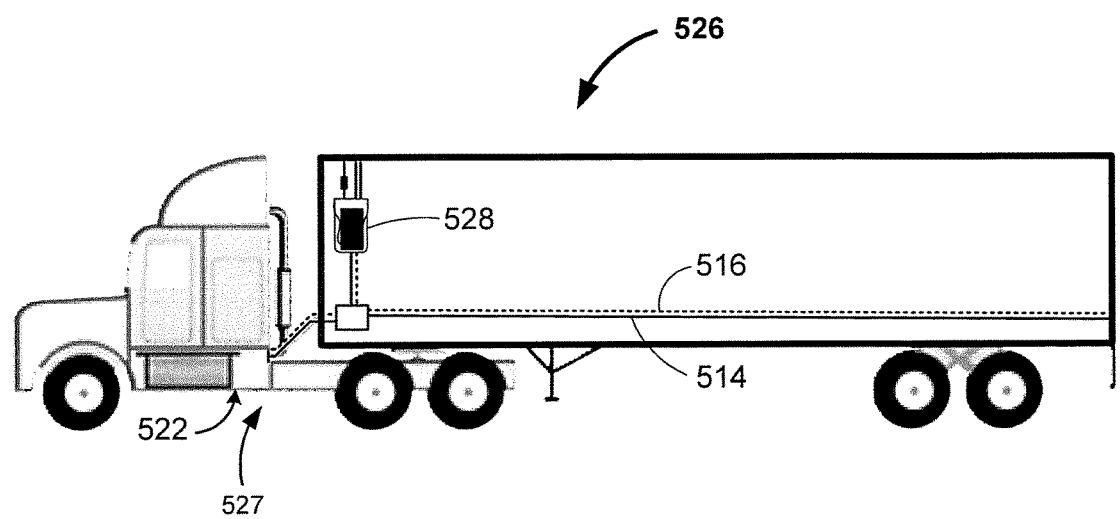
FIG. 32 shows a view in elevation of the semi-tractor/trailer combination, showing the semi-tractor control system communicating with the semi-trailer control system, which combine to form a semi-tractor/trailer combination pairing system.
Figure 34:
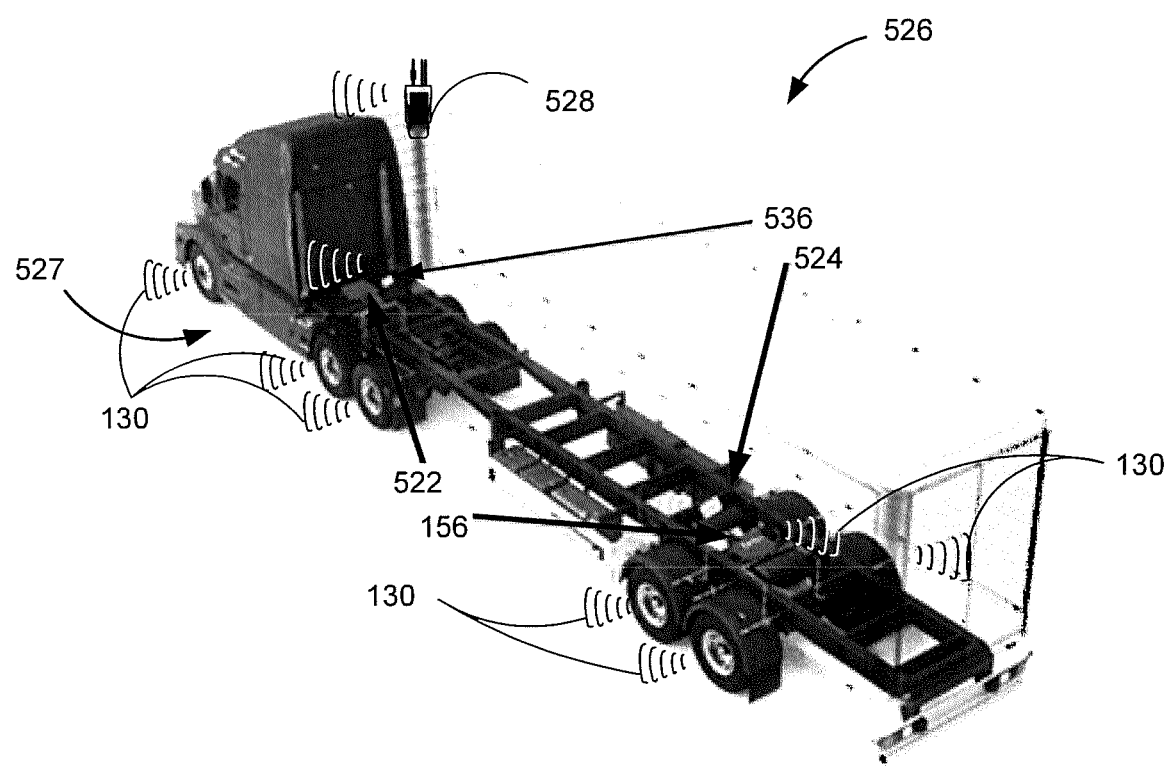
FIG. 34 is a perspective view in elevation of the semi-tractor/trailer combination equipped with a blind spot detection system.

The flow diagram 600 of FIG. 34 provides an overview of the operation of the pairing system 527 of FIG. 32.

Figure 33:
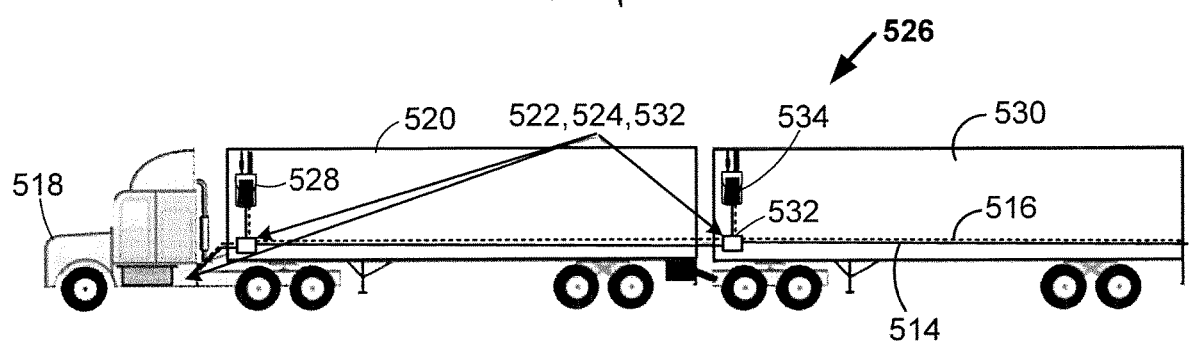
FIG. 33 is a side view in elevation of the semi-tractor/trailer and a third semi-trailer attached to the semi-tractor/trailer combination and supporting a third semi-trailer control system.

As shown by FIG. 33, a second semi-trailer 530, may be hooked to the first semi-trailer 520, of the semi-tractor/trailer combination 526. The second semi-trailer 530 is preferably equipped with a third system controller 532, and a second wireless control unit 534. The third system controller 532, is preferably interchangeable with the second system controller 524, and the second wireless control unit 534 is preferably interchangeable with the wireless control unit 528, of the semi-trailer 520.

FIG. 34 shows an integration of the tire pressure management system 110, of FIG. 10, with the pairing system 527, of FIG. 32. Preferably, the tire pressure monitoring sensors 130, of the tire pressure management 110, both of FIG. 10, provide tire pressure information from each tire of the semi-trailer 520 to the pressure management controller 156, of FIG. 21. The pressure management controller 156, in turn, conveys that information to the second system controller 524. The second system controller 524, passes that information to the wireless control unit 528, which transmits the tire pressure information to a truck wireless control unit 536. The truck wireless control unit 536, interacts with each the first system controller 522, and the wireless control system 528.

Figure 35:
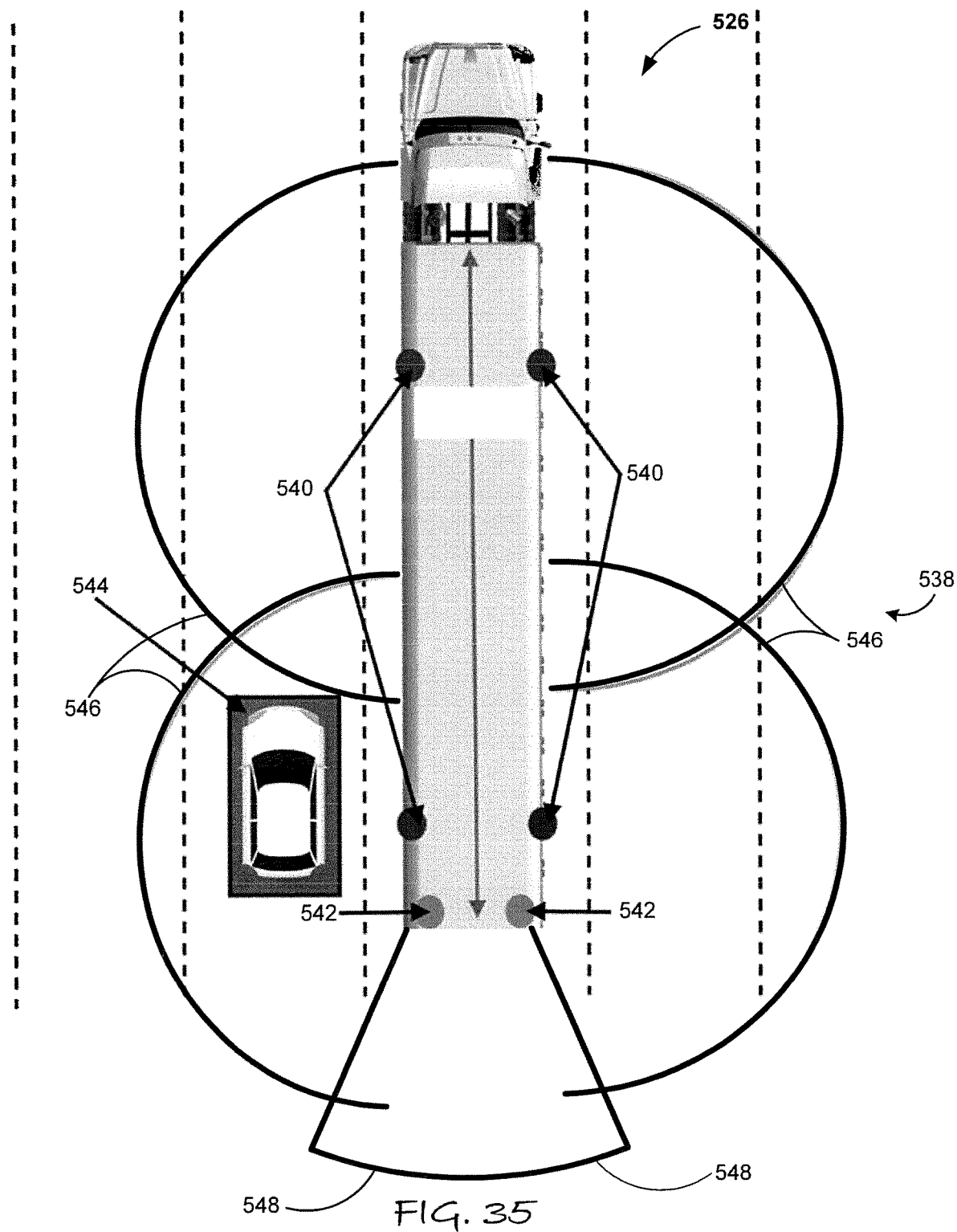
FIG. 35 is a top plan view of the semi-tractor/trailer combination equipped with blind spot detection system of FIG. 33.

FIG. 35 shows a further integration of an obstacle detection system 538, which provides a blind spot detection system 540, and a backup obstacle detection circuit 542. The blind spot detection system 540, generates a warning to an operator of the semi-tractor/trailer combination 526, when an obstacle, such as an auto 544, is within an operating zone 546, of the blind spot detection system 540. The blind spot detection system interacts with the second system controller 524, of FIG. 32, by providing obstacle present data to the second system controller 524. The second system controller 524, passes the obstacle present data to the wireless control system 528, which in turn passes the obstacle present data to the truck wireless control unit 536. The truck wireless control unit 536, passes the obstacle present data to the first system controller 522, which provides on visual, or audible prompt to the operator, alerting the operator of the presence of an object within the operating zone 546, of the blind spot detection system 540.

The backup obstacle detection circuit 542, provides a warning to the operator of the semi-tractor/trailer combination 526, when an obstacle, such as a loading dock, is within an operating zone 548, of the backup obstacle detection circuit 542. The backup obstacle detection circuit 542 interacts with the second system controller 524, of FIG. 32, by providing obstacle present data to the second system controller 524. The second system controller 524, passes the obstacle present data to the wireless control system 528, which in turn passes the obstacle present data to the truck wireless control unit 536. The truck wireless control unit 536, passes the obstacle present data to the first system controller 522, which provides a visual, or audible, prompt to the operator, alerting the operator of the presence of an object within the operating zone 548, of the backup obstacle detection circuit 542.

Figure 36:
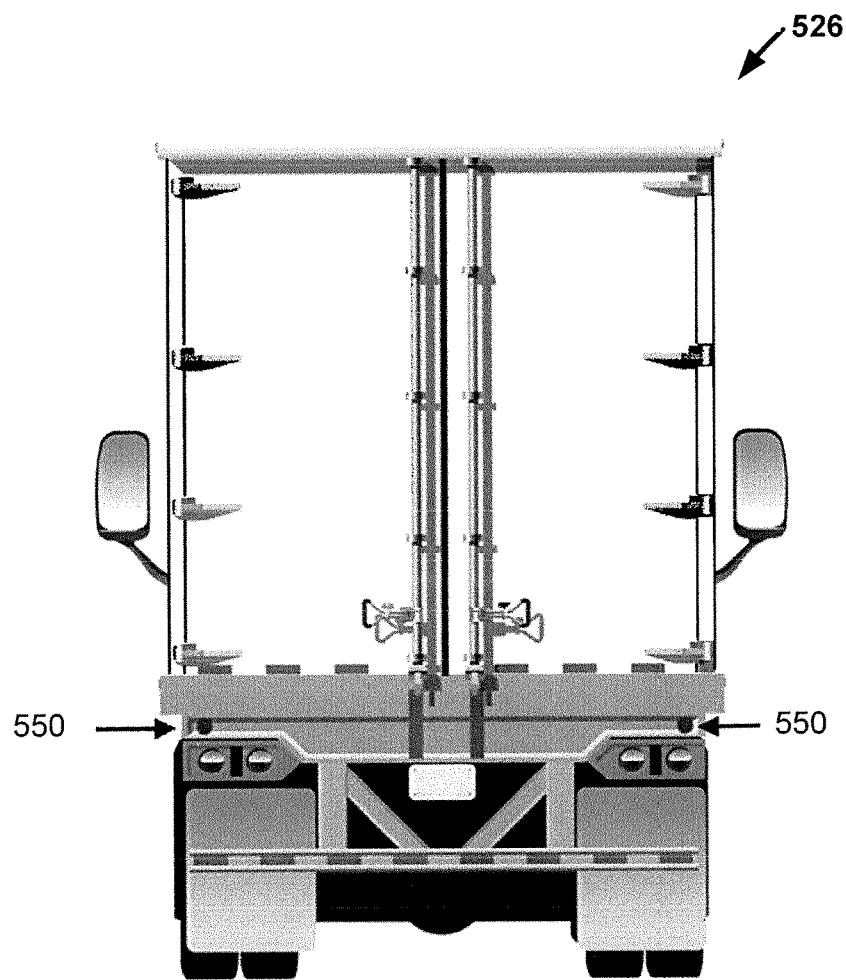
FIG. 36 is a rear view in elevation of the semi-tractor/trailer combination showing backup sensors of the obstacle detection system.

FIG. 36 shows a rear view in elevation of the semi-tractor/trailer combination 526, showing backup sensors 550, of the obstacle detection system 538. In a preferred embodiment, the backup sensors and blind spot sensors are preferably ultrasonic sensors. As those skilled in the art understand, other sensory technologies, such as radar, sonar, infer red, as well as other know detection technologies may be used.

As will be apparent to those skilled in the art, a number of modifications could be made to the preferred embodiments which would not depart from the spirit or the scope of the present invention. While the presently preferred embodiments have been described for purposes of this disclosure, numerous changes and modifications will be apparent to those skilled in the art. Insofar as these changes and modifications are within the purview of the appended claims, they are to be considered as part of the present invention.

What is claimed is:

1. A vehicle operational diagnostics and condition response system comprising:
   an axle supporting a vehicle frame of a commercial vehicle;
   a suspension disposed between and secured to each the vehicle frame and the axle;
   a load detection device interacting with the suspension and communicating with a system controller, the system controller supported by the vehicle frame; and
   a vehicle pairing circuit, the vehicle pairing circuit interacting with the system controller to establish a secure wireless connection with a trailer controller positioned on a trailer, the trailer separate from, and attached to, the vehicle frame.

2. The vehicle operational diagnostics and condition response system of claim 1, in which the axle is a first axle, the vehicle frame is a first vehicle frame, the commercial vehicle is a first commercial vehicle, the system controller is a first system controller, the vehicle pairing circuit is a first vehicle pairing circuit, the suspension is a first suspension, the load detection device is a first load detection device, and further comprising:
   a second axle supporting the trailer;
   a second suspension disposed between and secured to the trailer and the second axle;
   a second load detection device interacting with the second suspension and communicating with the trailer controller, the trailer controller supported by the second vehicle frame; and
   a second vehicle pairing circuit, the second vehicle pairing circuit interacting with the trailer controller.

3. The vehicle operational diagnostics and condition response system of claim 2, in which the first commercial vehicle further comprising a power connector supported by the first vehicle frame and interacting with the first system controller.

4. The vehicle operational diagnostics and condition response system of claim 3, in which the power connector is a first power connector, and in which the trailer comprising a second power connector supported by the second vehicle frame and interacting with the trailer controller.

5. The vehicle operational diagnostics and condition response system of claim 4, in which the first power connector provides a first auxiliary contact configured for interaction with a second auxiliary contact provided by the second power connector, and in which the first system controller passes a pre-pairing signal to the first auxiliary contact, the first auxiliary contact passes the pre-pairing signal to the second auxiliary contact, and the second auxiliary contact passes the pre-pairing signal to the trailer controller, the trailer controller responds to the first system controller thereby indicating a pairing between the first commercial vehicle and the trailer.

6. A method:
   attaching a trailer to a tractor;
   connecting a trailer controller to a tractor controller, the trailer controller supported by a frame of the trailer;
   detecting, with the trailer controller, a load compressing a suspension of the trailer; and
   adjusting a pressure in a first tire attached to the suspension, as directed by the trailer controller in response to the detected load, while the first tire is in rolling motion about a first hub.

7. The method of claim 6, wherein the trailer controller is connected to the tractor controller via a wireless data connection.

8. The method of claim 7, wherein the wireless data connection is secured by the tractor controller generating a private key and sharing the private key with the trailer controller.

9. The method of claim 7, wherein the tractor controller initiates a pairing process with the trailer controller by selecting a random and unique identification code and subsequently assigning the identification code to the trailer controller.

10. The method of claim 6, wherein the first hub consists of a rotary union assembly supplying pressurized air to the first tire while the first tire rotates about the first hub.

11. The method of claim 10, wherein the rotary union assembly supplies pressurized air to a second tire as the second tire rotate bout a second hub.

12. The method of claim 11, wherein the first hub and second hub are each attached to a single axle supported by the suspension.

13. The method of claim 11, wherein the first tire is inflated to a different tire pressure than the second tire.

14. The method of claim 6, wherein the load is detected via a sensor mounted proximal the suspension, the sensor connected to the trailer controller.

15. The method of claim 6, wherein the tractor controller generates a range of tire pressures for the first tire in response to the detected load.

16. The method of claim 15, wherein the tractor controller accounts for a no load tire pressure for the first tire when generating the range of tire pressures.

17. The method of claim 15, wherein the range of tire pressures consists of a maximum tire pressure value and a minimum tire pressure to safely transport the detected load.

18. The method of claim 15, wherein the trailer controller deflates air from the first tire while the first tire is in rolling motion to maintain a tire pressure in the first tire that is within the generated range of tire pressures.

19. The method of claim 15, further comprising changing the range of tire pressures in response to detection of a shift in the load.

20. The method of claim 6, further comprising changing the pressure in response to a detection of a shift in the load, the pressure changed while the first tire is in rolling motion about the first hub.

* * * * *